(12) United States Patent
Sloan et al.

(10) Patent No.: US 11,548,380 B2
(45) Date of Patent: Jan. 10, 2023

(54) SYSTEMS AND METHODS FOR MOUNTING A FUEL SYSTEM

(71) Applicant: Agility Fuel Systems LLC, Costa Mesa, CA (US)

(72) Inventors: Todd F. Sloan, Kelowna (CA); Chris Forsberg, Kelowna (CA)

(73) Assignee: Agility Fuel Systems LLC, Costa Mesa, CA (US)

( * ) Notice: Subject to any disclaimer, the term of this patent is extended or adjusted under 35 U.S.C. 154(b) by 92 days.

(21) Appl. No.: 16/922,866

(22) Filed: Jul. 7, 2020

(65) Prior Publication Data

US 2020/0384854 A1 Dec. 10, 2020

Related U.S. Application Data

(63) Continuation of application No. 16/193,809, filed on Nov. 16, 2018, now Pat. No. 10,744,873, which is a continuation of application No. 15/249,226, filed on Aug. 26, 2016, now Pat. No. 10,144,280, which is a continuation of application No. 14/795,821, filed on Jul. 9, 2015, now Pat. No. 9,457,652, which is a continuation of application No. 14/057,816, filed on Oct. 18, 2013, now Pat. No. 9,120,372.

(60) Provisional application No. 61/716,470, filed on Oct. 19, 2012.

(51) Int. Cl.
*B60K 15/07* (2006.01)
*B60K 15/067* (2006.01)
*B60K 15/063* (2006.01)

(52) U.S. Cl.
CPC ............ *B60K 15/07* (2013.01); *B60K 15/067* (2013.01); *B60K 2015/0636* (2013.01); *B60Y 2200/14* (2013.01); *Y10T 29/49948* (2015.01)

(58) Field of Classification Search
CPC .... B60K 15/07; B60K 15/067; Y10T 29/4995
See application file for complete search history.

(56) References Cited

U.S. PATENT DOCUMENTS

| 1,598,868 | A | 9/1926 | Frederick |
| 1,678,033 | A | 7/1928 | Brumbaugh |
| 3,760,134 | A | 9/1973 | McCray |
| 4,248,323 | A | 2/1981 | Gaffney |
| 4,317,497 | A | 3/1982 | Alt et al. |
| 4,365,681 | A | 12/1982 | Singh |

(Continued)

FOREIGN PATENT DOCUMENTS

| AU | 2018232986 | 4/2019 |
| CN | 2647706 | 10/2004 |

(Continued)

OTHER PUBLICATIONS

Tuma, "How to store lithium ion battery cell pack in electric bus?", dated Jul. 3, 2019, in 7 pages.

(Continued)

*Primary Examiner* — Kevin Hurley
(74) *Attorney, Agent, or Firm* — Knobbe, Martens Olson & Bear, LLP

(57) ABSTRACT

The invention provides systems and methods for mounting a fuel system to a vehicle. In some embodiments, the invention provides systems and methods for mounting a fuel system comprising a fuel tank to a vehicle chassis using a bracket, which may be a multi-part bracket, and may be referred to as a "drop and go" bracket.

21 Claims, 16 Drawing Sheets

(56) References Cited

U.S. PATENT DOCUMENTS

| | | |
|---|---|---|
| 5,054,799 A | 10/1991 | Fingerle |
| 5,136,752 A | 8/1992 | Bening et al. |
| 5,421,600 A | 6/1995 | Jones et al. |
| 5,460,234 A | 10/1995 | Matsuura et al. |
| 5,527,098 A | 6/1996 | McKinney |
| 5,558,949 A | 9/1996 | Iwatsuki et al. |
| 5,585,205 A | 12/1996 | Kohchi |
| 5,810,309 A | 9/1998 | Augustine et al. |
| 5,854,517 A | 12/1998 | Hines |
| 6,053,533 A | 4/2000 | Osborn et al. |
| 6,188,574 B1 | 2/2001 | Anazawa |
| 6,347,678 B1 | 2/2002 | Osborn et al. |
| 6,402,198 B2 | 6/2002 | Gollungberg |
| 6,443,253 B1 | 9/2002 | Whitehead et al. |
| 6,481,751 B1 | 11/2002 | Davis, Jr. et al. |
| 6,547,020 B2 | 4/2003 | Maus et al. |
| 6,575,258 B1 | 6/2003 | Clemmer |
| 6,624,610 B1 | 9/2003 | Ono et al. |
| 6,668,957 B2 | 12/2003 | King |
| 6,843,237 B2 | 1/2005 | Bowen et al. |
| 6,896,318 B2 | 5/2005 | Marrs et al. |
| 6,971,657 B2 | 12/2005 | King et al. |
| 7,051,825 B2 | 5/2006 | Masui et al. |
| 7,137,474 B2 | 11/2006 | Yokote |
| 7,144,039 B2 | 12/2006 | Kawasaki et al. |
| 7,189,040 B2 | 3/2007 | Sharp |
| 7,237,644 B2 | 7/2007 | Matsumoto et al. |
| 7,270,209 B2 | 9/2007 | Suess |
| 7,398,849 B2 | 7/2008 | Yoshida |
| 7,507,499 B2 | 3/2009 | Zhou et al. |
| 7,931,105 B2 | 4/2011 | Sato et al. |
| 7,984,925 B2 | 7/2011 | Levin et al. |
| 8,037,960 B2 | 10/2011 | Kiya |
| 8,051,934 B2 | 11/2011 | Kiya et al. |
| 8,056,928 B2 | 11/2011 | Ijaz et al. |
| 8,127,876 B2 | 3/2012 | Phillips |
| 8,276,697 B2 | 10/2012 | Takasaki |
| 8,342,279 B1 | 1/2013 | Florus et al. |
| 8,381,955 B2 | 2/2013 | Grater et al. |
| 8,397,853 B2 | 3/2013 | Stefani et al. |
| 8,464,817 B2 | 6/2013 | Usami et al. |
| 8,474,559 B2 | 7/2013 | Sogabe |
| 8,517,126 B2 | 8/2013 | Atarashi |
| 8,596,685 B2 | 12/2013 | Mauduit et al. |
| 8,616,319 B2 | 12/2013 | Yokoyama et al. |
| 8,672,354 B2 | 3/2014 | Kim et al. |
| 8,701,842 B2 | 4/2014 | Anderson |
| 8,764,469 B2 | 7/2014 | Lamb |
| 8,776,927 B2 | 7/2014 | Akazawa et al. |
| 8,778,527 B2 | 7/2014 | Lee |
| 8,783,396 B2 | 7/2014 | Bowman |
| 8,789,635 B2 | 7/2014 | Franzen et al. |
| 8,794,361 B2 | 8/2014 | Lim et al. |
| 8,905,170 B2 | 12/2014 | Kyoden et al. |
| 9,033,078 B2 | 5/2015 | Fillion et al. |
| 9,033,085 B1 | 5/2015 | Rawlinson |
| 9,056,557 B2 | 6/2015 | Kedzierski |
| 9,061,584 B2 | 6/2015 | Vargo et al. |
| 9,061,712 B2 | 6/2015 | Patberg et al. |
| 9,077,019 B2 | 7/2015 | Kosaki et al. |
| 9,085,226 B2 | 7/2015 | Matsuda et al. |
| 9,103,092 B2 | 8/2015 | Ueda |
| 9,108,497 B2 | 8/2015 | Harrison, III et al. |
| 9,108,691 B2 | 8/2015 | Fanourakis et al. |
| 9,120,372 B2 | 9/2015 | Sloan et al. |
| 9,205,749 B2 | 12/2015 | Sakamoto |
| 9,227,582 B2 | 1/2016 | Katayama et al. |
| 9,283,838 B2 | 3/2016 | Ohashi |
| 9,315,173 B1 | 4/2016 | Gray et al. |
| 9,321,352 B2 | 4/2016 | Pierce et al. |
| 9,409,495 B2 | 8/2016 | Kobayashi |
| 9,457,652 B2 | 10/2016 | Sloan et al. |
| 9,586,490 B2 | 3/2017 | Yamamaru et al. |
| 9,636,984 B1 | 5/2017 | Baccouche et al. |
| 9,776,665 B2 | 10/2017 | Garay et al. |
| 9,812,685 B2 | 11/2017 | Nozaki et al. |
| 9,884,545 B1 | 2/2018 | Addanki et al. |
| 9,902,348 B2 | 2/2018 | Takeda |
| 10,000,908 B2 | 6/2018 | Ota et al. |
| 10,017,037 B2 | 7/2018 | Newman et al. |
| 10,081,243 B2 | 9/2018 | Zimmerman et al. |
| 10,121,609 B2 | 11/2018 | Coursol |
| 10,144,280 B2 | 12/2018 | Sloan et al. |
| 10,160,344 B2 | 12/2018 | Newman |
| 10,166,883 B2 | 1/2019 | Brendecke et al. |
| 10,177,356 B1 | 1/2019 | Yang et al. |
| 10,183,698 B2 | 1/2019 | Ta et al. |
| 10,199,781 B2 | 2/2019 | Deatherage |
| 10,236,496 B2 | 3/2019 | Nakayama et al. |
| 10,259,329 B2 | 4/2019 | Hosaka et al. |
| 10,308,132 B2 | 6/2019 | Milton et al. |
| 10,358,023 B2 | 7/2019 | Hegewald et al. |
| 10,358,024 B2 | 7/2019 | Yugami et al. |
| 10,369,884 B2 | 8/2019 | Sloan et al. |
| 10,414,351 B2 | 9/2019 | Katano |
| 10,421,345 B2 | 9/2019 | Kerspe et al. |
| 10,427,627 B2 | 10/2019 | Fukazu et al. |
| 10,457,156 B2 | 10/2019 | Takizawa et al. |
| 10,464,613 B2 | 11/2019 | Okura |
| 10,486,515 B2 | 11/2019 | Saeki |
| 10,493,837 B1 | 12/2019 | Angelo et al. |
| 10,516,146 B2 | 12/2019 | Fees et al. |
| 10,543,796 B2 | 1/2020 | Isafushi et al. |
| 10,559,858 B2 | 2/2020 | Goitsuka et al. |
| 10,569,634 B2 | 2/2020 | Dawley |
| 10,583,746 B2 | 3/2020 | Ogaki et al. |
| 10,589,788 B1 | 3/2020 | Milton et al. |
| 10,589,797 B2 | 3/2020 | Milton et al. |
| 10,604,188 B2 | 3/2020 | Yoshii |
| 10,611,408 B2 | 4/2020 | Fritz et al. |
| 10,641,431 B2 | 5/2020 | Mallick et al. |
| 10,654,530 B2 | 5/2020 | Milton et al. |
| 10,661,680 B2 | 5/2020 | Milton et al. |
| 10,661,844 B2 | 5/2020 | Milton et al. |
| 10,668,807 B2 | 6/2020 | Milton et al. |
| 10,670,191 B2 | 6/2020 | Yeggy |
| 10,688,856 B2 | 6/2020 | Kasai et al. |
| 10,688,857 B2 | 6/2020 | Tsuyuzaki et al. |
| 10,696,251 B2 | 6/2020 | Muramatsu et al. |
| 10,703,416 B2 | 7/2020 | Okura et al. |
| 10,744,873 B2 | 8/2020 | Sloan et al. |
| 10,752,102 B2 | 8/2020 | Lampsa et al. |
| 10,823,333 B2 | 11/2020 | Criel et al. |
| 10,864,859 B2 | 12/2020 | Sloan et al. |
| 10,899,214 B2 | 1/2021 | Sloan et al. |
| 10,906,395 B2 | 2/2021 | Gibb et al. |
| 11,040,610 B2 | 6/2021 | Sloan et al. |
| 11,043,714 B2 | 6/2021 | Sloan et al. |
| 11,110,786 B2 | 9/2021 | Loacker |
| 11,241,953 B2 | 2/2022 | Yordanov et al. |
| 11,312,221 B2 | 4/2022 | Sloan et al. |
| 11,345,331 B2 | 5/2022 | McKibben et al. |
| 2004/0134699 A1 | 7/2004 | Shimizu |
| 2004/0178602 A1 | 9/2004 | King et al. |
| 2004/0231831 A1 | 11/2004 | Houck et al. |
| 2005/0162015 A1 | 7/2005 | Yamaguchi et al. |
| 2005/0218136 A1 | 10/2005 | Kotani et al. |
| 2006/0102398 A1 | 5/2006 | Mizuno |
| 2007/0092764 A1 | 4/2007 | Kobayashi |
| 2008/0067209 A1 | 3/2008 | Gunn |
| 2008/0169139 A1 | 7/2008 | Kramer |
| 2008/0169144 A1 | 7/2008 | DeGraves et al. |
| 2008/0225483 A1 | 9/2008 | Kahn et al. |
| 2008/0258682 A1 | 10/2008 | Li |
| 2009/0114784 A1 | 5/2009 | Tam |
| 2009/0201650 A1 | 8/2009 | Hauser et al. |
| 2010/0000816 A1 | 1/2010 | Okada |
| 2010/0065597 A1 | 3/2010 | Grater et al. |
| 2010/0112843 A1 | 5/2010 | Heichal et al. |
| 2010/0163326 A1 | 7/2010 | Takamura et al. |
| 2010/0175940 A1 | 7/2010 | Taneda et al. |
| 2010/0320012 A1 | 12/2010 | van der Stappen et al. |
| 2011/0068622 A1 | 3/2011 | Ikeno et al. |
| 2011/0114398 A1 | 5/2011 | Bianco |

(56) References Cited

U.S. PATENT DOCUMENTS

| | | |
|---|---|---|
| 2011/0233353 A1 | 9/2011 | Palmer |
| 2011/0260530 A1 | 10/2011 | Steffka et al. |
| 2012/0055725 A1 | 3/2012 | Mizoguchi et al. |
| 2012/0080466 A1 | 4/2012 | Schultheis et al. |
| 2012/0090907 A1 | 4/2012 | Store et al. |
| 2012/0103714 A1 | 5/2012 | Choi et al. |
| 2012/0160583 A1 | 6/2012 | Rawlinson |
| 2012/0161430 A1 | 6/2012 | Mulanon |
| 2012/0175177 A1 | 7/2012 | Lee et al. |
| 2012/0228307 A1 | 9/2012 | Simmons |
| 2012/0255799 A1 | 10/2012 | Kohler et al. |
| 2012/0312612 A1 | 12/2012 | Harrision, III et al. |
| 2013/0001384 A1 | 1/2013 | Karlsson et al. |
| 2013/0108404 A1 | 5/2013 | Okumura et al. |
| 2013/0108897 A1 | 5/2013 | Christian et al. |
| 2013/0199863 A1 | 8/2013 | Robbins |
| 2013/0248268 A1 | 9/2013 | Matsuda et al. |
| 2013/0334381 A1 | 12/2013 | Vargo, Jr. et al. |
| 2014/0137953 A1 | 5/2014 | Gibb et al. |
| 2014/0141288 A1 | 5/2014 | Kim et al. |
| 2014/0175782 A1 | 6/2014 | Sloan et al. |
| 2014/0287284 A1 | 9/2014 | Shibata |
| 2014/0338999 A1 | 11/2014 | Fujii et al. |
| 2014/0367183 A1 | 12/2014 | Matsuda |
| 2014/0367954 A1 | 12/2014 | McKinney et al. |
| 2015/0108747 A1 | 4/2015 | Goedken |
| 2015/0175353 A1 | 6/2015 | Gillmore et al. |
| 2015/0291056 A1 | 10/2015 | Nozaki |
| 2016/0023548 A1 | 1/2016 | Crist et al. |
| 2016/0079795 A1 | 3/2016 | Patterson et al. |
| 2016/0082910 A1 | 3/2016 | Sloan et al. |
| 2016/0087256 A1 | 3/2016 | Wagner et al. |
| 2016/0190526 A1 | 6/2016 | Yamada et al. |
| 2016/0226041 A1 | 8/2016 | Jackson et al. |
| 2016/0297283 A1 | 10/2016 | Sakamoto et al. |
| 2017/0334288 A1 | 1/2017 | Rike et al. |
| 2017/0057348 A1 | 3/2017 | Arold et al. |
| 2017/0101003 A1 | 4/2017 | Zimmerman et al. |
| 2017/0225558 A1 | 8/2017 | Newman et al. |
| 2017/0282709 A1 | 10/2017 | Sasaki et al. |
| 2017/0320382 A1 | 11/2017 | Milton et al. |
| 2018/0022389 A1 | 1/2018 | Kageyama et al. |
| 2018/0062125 A1 | 3/2018 | Kaneshige |
| 2018/0145382 A1 | 5/2018 | Harris et al. |
| 2018/0183118 A1 | 6/2018 | Harris et al. |
| 2018/0190960 A1 | 7/2018 | Harris et al. |
| 2018/0257580 A1 | 9/2018 | Sloan et al. |
| 2018/0283610 A1 | 10/2018 | Wexler et al. |
| 2018/0319263 A1 | 11/2018 | Hegewald et al. |
| 2018/0339594 A1 | 11/2018 | Brown et al. |
| 2018/0370368 A1 | 12/2018 | Kronsteiner et al. |
| 2019/0036181 A1 | 1/2019 | Tokozakura et al. |
| 2019/0061505 A1 | 2/2019 | Cavus et al. |
| 2019/0074495 A1 | 3/2019 | Haeusler et al. |
| 2019/0074497 A1 | 3/2019 | Haeusler et al. |
| 2019/0081298 A1 | 3/2019 | Matecki et al. |
| 2019/0181517 A1 | 3/2019 | Kellner et al. |
| 2019/0202312 A1 | 7/2019 | Aufdencamp |
| 2019/0229314 A1 | 7/2019 | Ribbentrop et al. |
| 2019/0263449 A1 | 8/2019 | Ta et al. |
| 2019/0291560 A1 | 9/2019 | Lampsa et al. |
| 2019/0302764 A1 | 10/2019 | Smith et al. |
| 2019/0326573 A1 | 10/2019 | Ozawa et al. |
| 2019/0393571 A1 | 12/2019 | Weicker et al. |
| 2020/0072315 A1 | 3/2020 | Seno et al. |
| 2020/0083573 A1 | 3/2020 | Caliskan et al. |
| 2020/0088299 A1 | 3/2020 | Baumer et al. |
| 2020/0094669 A1 | 3/2020 | DeLizo et al. |
| 2020/0139808 A1 | 5/2020 | Rike |
| 2020/0156500 A1 | 5/2020 | Huff et al. |
| 2020/0180848 A1 | 6/2020 | Snyder et al. |
| 2020/0247225 A1 | 8/2020 | Kochi et al. |
| 2020/0259143 A1 | 8/2020 | Sloan et al. |
| 2020/0331536 A1 | 10/2020 | Sloan et al. |
| 2020/0335840 A1 | 10/2020 | Sloan et al. |
| 2020/0369228 A1 | 11/2020 | Kageyama et al. |
| 2020/0406777 A1 | 12/2020 | Nguyen et al. |
| 2021/0036649 A1 | 2/2021 | Iwazaki |
| 2021/0129663 A1 | 5/2021 | Yordanov et al. |
| 2022/0021056 A1 | 1/2022 | Sloan et al. |
| 2022/0048380 A1 | 2/2022 | Yordanov et al. |
| 2022/0111716 A1 | 4/2022 | McKibben et al. |
| 2022/0118846 A1 | 4/2022 | Yordanov et al. |
| 2022/0242215 A1 | 8/2022 | Sloan et al. |

FOREIGN PATENT DOCUMENTS

| | | |
|---|---|---|
| CN | 103863080 | 6/2014 |
| CN | 105438262 | 3/2016 |
| CN | 105443221 | 3/2016 |
| DE | 101 08 713 A1 | 9/2002 |
| DE | 10 2006 009 189 | 7/2007 |
| DE | 10 2011 109 024 | 1/2013 |
| DE | 10 2012 109062 | 3/2014 |
| DE | 10 2013 000112 | 3/2014 |
| DE | 10 2016 002 097 | 9/2016 |
| EP | 1 577 143 A1 | 9/2005 |
| EP | 2 065 247 A1 | 11/2008 |
| EP | 2130747 A2 | 12/2009 |
| EP | 2165875 A2 | 3/2010 |
| EP | 2 554 420 | 5/2014 |
| EP | 2 712 748 B1 | 5/2017 |
| EP | 3 640 123 A1 | 4/2020 |
| GB | 491788 | 9/1938 |
| GB | 527052 | 10/1940 |
| GB | 744973 A | 2/1956 |
| GB | 2546535 A | 7/2017 |
| GB | 2555906 | 5/2018 |
| JP | H11-278069 A | 10/1999 |
| JP | 2005-138771 A | 6/2005 |
| JP | 2009-220680 A | 10/2009 |
| JP | 2010-100207 | 5/2010 |
| JP | 2014-069686 | 4/2014 |
| KR | 10-1998-0035495 | 8/1998 |
| KR | 10-2017-0000950 | 1/2017 |
| WO | WO 2007/133213 A1 | 11/2007 |
| WO | WO 2012/087224 A1 | 6/2012 |
| WO | WO 2012/115622 A1 | 8/2012 |
| WO | WO 2014/044618 | 3/2014 |
| WO | WO 2014/063018 A1 | 4/2014 |
| WO | WO 2016/210329 | 12/2016 |
| WO | WO 2016/210329 A1 | 12/2016 |
| WO | WO 2018/123337 A1 | 7/2018 |
| WO | WO 2018/135990 A1 | 7/2018 |
| WO | WO 2020/041630 A1 | 2/2020 |
| WO | WO 2020/197856 | 10/2020 |
| WO | WO 2020/215018 | 10/2020 |
| WO | WO 2020/215023 | 10/2020 |
| WO | WO 2022/125929 | 6/2022 |

OTHER PUBLICATIONS

Tuma, Sliding Rails for Ebus Lithium Battery Pack Tray Automatic Bus Door Opening Mechanism, dated Aug. 15, 2019, in 3 pages.
European search report and search opinion dated Feb. 5, 2016 for EP Application No. 13847471.3.
Kenworth, "K270E, Zero Emissions", 2020, in 2 pages.
International Search Report and Written Opinion, dated Jan. 21, 2014 for PCT/US2013/065625.
U.S. Appl. No. 15/851,416, Tailgate Fuel System Mounting System, filed Dec. 21, 2017.
U.S. Appl. No. 14/057,816, Systems and Methods for Mounting a Fuel System, filed Oct. 18, 2013.
U.S. Appl. No. 14/795,821, Systems and Methods for Mounting a Fuel System, filed Jul. 9, 2015.
U.S. Appl. No. 15/249,226, Systems and Methods for Mounting a Fuel System, filed Aug. 26, 2016.
U.S. Appl. No. 16/193,809, Systems and Methods for Mounting a Fuel System, filed Nov. 16, 2018.
U.S. Appl. No. 15/886,773, Tailgate Fuel Storage System, filed Feb. 1, 2018.

(56) References Cited

OTHER PUBLICATIONS

U.S. Appl. No. 17/149,466, Fuel System Mountable to a Vehicle Frame Rail, filed Jan. 14, 2021.
U.S. Appl. No. 17/646,377, Fuel System Mountable to a Vehicle Frame Rail, filed Dec. 29, 2021.
U.S. Appl. No. 17/452,940, Fuel System Mountable to a Vehicle Frame, filed Oct. 29, 2021.
U.S. Appl. No. 16/863,329, Polymeric Liner Based Gas Cylinder With Reduced Permeability, filed Apr. 30, 2020.
U.S. Appl. No. 17/452,951, Fuel System Mountable to a Vehicle Frame, filed Oct. 29, 2021.
U.S. Appl. No. 17/452,937, Fuel System Mountable to a Vehicle Frame, filed Oct. 29, 2021.

SYSTEMS AND METHODS FOR MOUNTING A FUEL SYSTEM

CROSS-REFERENCE

This application is a continuation application of U.S. patent application Ser. No. 16/193,809, filed on Nov. 16, 2018, now U.S. Pat. No. 10,744,873, which is a continuation application of U.S. patent application Ser. No. 15/249,226, filed on Aug. 26, 2016, now U.S. Pat. No. 10,144,280, which is a continuation application of U.S. patent application Ser. No. 14/795,821, filed on Jul. 9, 2015, now U.S. Pat. No. 9,457,652, which is a continuation application of U.S. patent application Ser. No. 14/057,816, filed on Oct. 18, 2013, now U.S. Pat. No. 9,120,372, which application claims priority to U.S. Provisional Application Ser. No. 61/716,470, filed on Oct. 19, 2012, all of which are incorporated herein by reference in their entirety.

BACKGROUND OF THE INVENTION

Vehicles, such as natural-gas powered vehicles, typically require the use of fuel tanks under certain pressure or temperature requirements. The fuel tanks can be mounted on the vehicle. Side-mounted compressed gas tanks are rigidly mounted to a vehicle chassis in a complicated and lengthy procedure that requires the removal of the vehicle from the assembly line. Such techniques for mounting a fuel systems onto vehicles are often very time consuming and costly.

SUMMARY OF INVENTION

Recognized herein is the need for devices, systems and methods to improve performance, decrease installation time and improve safety of mounting fuel supply to a vehicle.

The invention provides devices, systems and methods for mounting a fuel system to a vehicle. Some embodiments provide systems and methods for mounting a fuel system comprising a fuel tank to a vehicle chassis using a bracket, which may be a multi-part bracket, and may be referred to as a "drop and go" bracket.

An aspect of the invention is directed to a drop and go bracket comprising: a first bracket portion configured to be attached to a vehicle chassis; and a second bracket portion configured to be attached to a vehicle fuel system, wherein the first bracket portion and the second bracket portion are configured to be engaged and connected to one another in a manner that (i) mounts the vehicle fuel system to the vehicle chassis and (ii) prevents substantial translation without rotation between the first bracket portion and the second bracket portion in a lateral direction and in a vertical direction without the aid of additional fasteners.

Another aspect of the invention is directed to a vehicle fuel mounting system comprising: a first bracket portion attached to a vehicle chassis; and a second bracket portion attached to a vehicle fuel system, wherein the first bracket portion and the second bracket portion are configured to be engaged and interlock in order to mount the vehicle fuel system to the vehicle chassis without the aid of additional fasteners.

Furthermore, aspects of the invention are directed to a method for mounting a fuel system to a vehicle comprising: attaching a first bracket portion to a vehicle chassis; attaching a second bracket portion to a vehicle fuel system; and attaching the second bracket portion attached to the vehicle fuel system to the first bracket portion attached to the vehicle by one or more of the following: (i) sliding a part of the first bracket portion into a cutout, indentation, or hole of the second bracket portion, or (ii) sliding a part of the second bracket portion into a cutout, indentation, or hole of the first bracket portion.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF INVENTION

The invention provides systems and methods for mounting a fuel system to a vehicle. In some embodiments, the invention provides systems and methods for mounting a fuel system comprising a fuel tank to a vehicle chassis using a bracket, which may be a multi-part bracket, and may be referred to as a "drop and go" bracket. Various aspects of the invention described herein may be applied to any of the particular applications set forth below or in any other type of mounting and/or attachment setting. The invention may be applied as a standalone method or system, or as part of an integrated mounting and/or attachment system. It shall be understood that different aspects of the invention can be appreciated individually, collectively, or in combination with each other.

Figure 1:
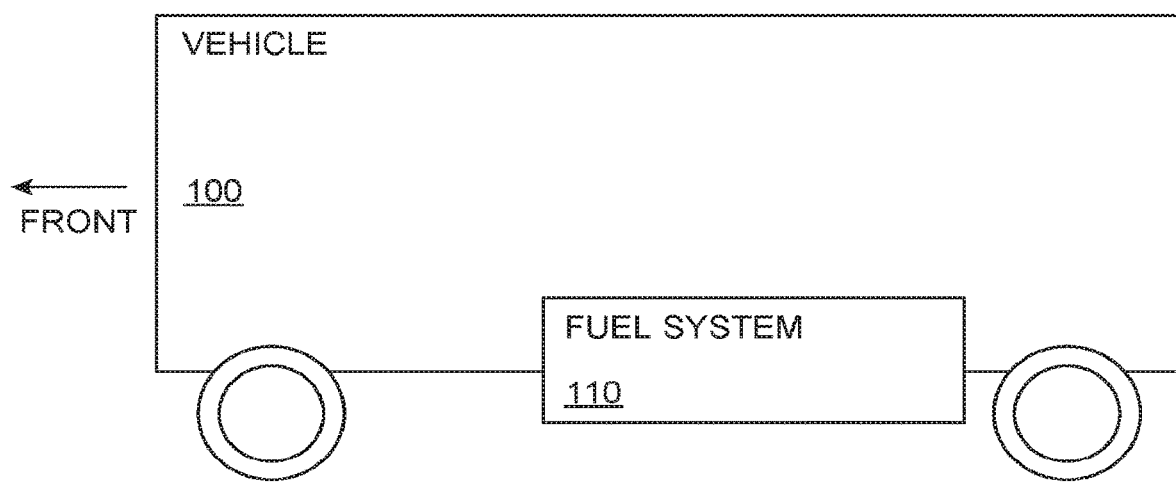
FIG. 1 is a schematic of a fuel system carried on board a vehicle.

FIG. 1 is a schematic of a vehicle 100 with a fuel system 110 mounted thereon. A vehicle 100 may be any type of vehicle known in the art. A vehicle may be a truck, such as a light duty truck (e.g., class 1, class 2 or class 3), medium duty truck (e.g., class 4, class 5 or class 6), or heavy-duty truck (e.g., class 7 or class 8). In some embodiments, the vehicles may be cars, wagons, vans, buses, high-occupancy vehicles, dump trucks, tractor trailer trucks, transit, refuse or heavy-duty vehicles, or any other vehicles. The vehicle may have any weight. For example, the vehicle may weigh more than or equal to about 5000 lbs, 7,500 lbs, 10,000 lbs, 12,500 lbs, 15,000 lbs, 17,500 lbs, 20,000 lbs, 22,500 lbs, 25,000 lbs, 30,000 lbs, or 35,000 lbs.

The fuel system 110 may be mounted to the vehicle in various configurations. For example, in a side-mount configuration, a fuel system 110 may be installed on the side of the vehicle frame rail (not shown). Fuel systems may be installed on one or both sides of the vehicle, providing, for example, standard fuel capacities, measured in diesel gallon equivalents (DGE), of 40 DGE, 60 DGE, 80 DGE, 100 DGE, or 120 DGE or more. In another example, in a behind-the-cab configuration, a fuel system 110 may be installed behind the cab on the vehicle frame rail, providing, for example, standard fuel capacities of 45 DGE, 60 DGE, 75 DGE or 100 DGE. In a further example, in a roof mount configuration, a fuel system 110 may be installed on the roof of the vehicle body or in a custom integration, providing a wide range of customizable fuel capacities. In an additional example, in a front-of-the-body configuration, a fuel system 110 may be installed in front of the vehicle body, providing, for example, standard fuel capacities of 60-100 DGE. In some embodiments, mounting to the vehicle chassis may include, but is not be limited to, the vehicle frame rail.

A vehicle 100 may be propelled by a fuel, including, but not limited to, compressed natural gas (CNG), liquefied natural gas (LNG), liquefied petroleum gas (LPG), Diesel fuel, gasoline, dimethyl ether (DME), methanol, ethanol, butanol, Fischer-Tropsch (FT) fuels, hydrogen or hydrogen-based gas, hythane, HCNG, syngas and/or other alternative fuels or fuel blends. For example, natural gas in the form of CNG or LNG may be an alternative fuel of choice for transit, refuse, and many other heavy-duty vehicles.

The fuel may be stored as a compressed gas, as a liquefied gas or as a liquid under its own vapor pressure. The fuel may be stored in an on-board fuel system 110, comprising a fuel tank, vessel, or any other type of device capable of containing a fuel in compressed gas, liquefied gas or liquid form. Any description of a fuel tank herein may also be applied to other types of fuel containing devices.

The fuel tank may be configured in accordance with the chosen fuel storage mode. For example, compressed gases, such as CNG, may require that the fuel tank be outfitted with adequate high pressure components (e.g., high pressure seals, relief valves, compression devices), wherein high-strength and lightweight materials may allow CNG pressures up to, for example, 3,600 psig. In another example, liquefied gases, such as LNG, may require that the fuel tank be outfitted with adequate liquefaction components (e.g., coolers, liquid-vapor separators, insulation). LNG systems may operate at pressures of, for example, 0 psig, 50 psig, 100 psig, 150 psig, 200 psig, 250 psig, 300 psig, or 350 psig and temperatures of, for example, −259° F., −223° F., −200° F., −186° F., −175° F., −167° F., −158° F., or −150° F., requiring the use of cryogenic (about −260° F.) piping systems and vacuum-insulated storage tanks.

In some embodiments, a vehicle 100 may contain a single fuel tank. In other embodiments, the vehicle may contain a plurality of fuel tanks. The tanks may or may not have the same characteristics. The tanks may be mounted to any portion of the vehicle. In some embodiments, the tanks may be mounted to a side of the vehicle. One, two, or more tanks may be mounted on a single side of the vehicle, or on each side of the vehicle. The side-mounted tanks may at least partially protrude from a side surface of the vehicle.

The one or more fuel tanks may provide storage for a predetermined amount, or capacity, of fuel. For example, for natural gas measured in diesel/gasoline gallon equivalents (where 1 gasoline gallon equivalent (GGE)=standard cubic feet (SCF) of natural gas divided by 123, and 1 diesel gallon equivalent (DGE)=standard cubic feet (SCF) of natural gas divided by 139), the amount of fuel provided on board the vehicle may be, for example, up to about 28 DGE, 45 DGE, 52 DGE, 60 DGE, 63 DGE, 70 DGE, 75 DGE, 80 DGE, 88 DGE, 92 DGE, 140 DGE, 100 DGE, 105 DGE, 120 DGE, 140 DGE, 160 DGE, 176 DGE, or more than 176 DGE.

The fuel tank may have any size and/or weight. For example, the fuel tank may be larger than, smaller than, or about the same size as a 5 gallon tank, 7 gallon tank, 10 gallon tank, 15 gallon tank, 20 gallon tank, 25 gallon tank, 30 gallon tank, 40 gallon tank, 50 gallon tank, 70 gallon tank, 90 gallon tank, 110 gallon tank, 130 gallon tank, 150 gallon tanks, or 170 gallon tank. The fuel tank may weigh more than, less than, or equal to about 0.01 tons, 0.03 tons, 0.05 tons, 0.07 tons, 0.1 tons, 0.2 tons, 0.3 tons, 0.5 tons, 0.7 tons, or 1.0 tons. For example, the fuel tanks may be of cylindrical form with dimensions (radius in inches×length in inches) of, for example, 25"×39", 25"×61", 25"×80", 25"×90", 26"×80", 26"×90", 26"×120", 26"×76", 16"×80", 21"×86", 16"×120", 21"×70", 21"×86", and one or more cylinders may be combined to achieve a predetermined total fuel capacity.

The fuel system 110 may be capable of containing a fuel at a predetermined pressure. For example, the fuel system 110 may be capable of containing a fuel having a pressure of less than or equal to about 10000 psig, 8000 psig, 7000 psig, 6500 psig, 6000 psig, 5500 psig, 5000 psig, 4750 psig, 4500 psig, 4250 psig, 4000 psig, 3750 psig, 3500 psig, 3250 psig, 3000 psig, 2750 psig, 2500 psig, 2000 psig, 1500 psig, 1000 psig, 500 psig, 300 psig, 100 psig, or less. Optionally, the fuel system may be structurally capable of containing a fuel having a high pressure value, such as at least the pressure values described above.

In embodiments requiring cooling and/or insulation, such as in LNG fuel systems, the fuel system components may be appropriately outfitted with insulation, chillers and/or other components known in the art. For example, the fuel transfer lines and the fuel tank may be wound with insulation.

The fuel system 110 may have one or more fuel outputs. The fuel output may transfer the fuel to another part of the vehicle 100, such as an engine. In one example, the fuel may be output to mix with air in the cylinder of an engine. The fuel may be used in the process of propelling the vehicle. Further, the fuel system 110 may have one or more fuel inputs. The fuel inputs may transfer the fuel from an external fuel supply to another part of the vehicle 100, such as the one or more on-board fuel tanks.

The fuel system 110 may comprise one or more fuel tanks, fuel tank fill systems, fuel distribution systems, electronic sensors and control units, and/or other components or subsystems, such as the devices, systems and methods provided in U.S. Provisional Patent Application Ser. No. 61/613,933 ("SMART COVERS"), filed Mar. 21, 2012, which is incorporated herein by reference in its entirety. The fuel system 110 may be housed in a cover, which may be mounted to the vehicle, and may serve to contain and protect the fuel tank and other fuel system components. The cover may be made of a variety of materials, including, but not limited to, metal or metal alloys (e.g., steel, iron, aluminum, titanium, copper, brass, nickel, silver, or any alloys or combinations thereof), composite materials (e.g., carbon fiber, fiberglass), or polymer materials. The cover may be made of a single material or may comprise multiple pieces made of different materials. The fuel system 110 may be partially housed in the cover. In some embodiments, one or more components of the fuel system 110 may reside outside of the cover. For example, the fuel distribution system components may reside partially inside and partially outside of the cover, or fully outside (e.g., within the body of the vehicle) of the cover.

One or more fuel systems 110 may be provided on board the vehicle and may be housed in a unified cover, in separate covers, or a combination thereof. For example, multiple fuel tanks may be housed in one cover. Some fuel tanks may be provided in a common cover, while other fuel tanks may be provided in separate covers. The fuel system 110 may be rated at a predetermined pressure (e.g., 3600 psig). The cover may or may not be configured to withstand explosion within the fuel system 110.

In accordance with an aspect of the invention, the fuel system 110 may be mounted to the vehicle chassis, such as, for example, to the vehicle frame rail, using one or more drop and go brackets. The bracket(s) may be fabricated from any material. In some instances, the bracket(s) may include a metal or metal alloy including but not limited to steel, iron, aluminum, titanium, copper, brass, nickel, silver, or any alloys or combinations thereof. In some instances, the bracket(s) may include a composite material, such as carbon fiber, or fiberglass. The bracket(s) may include a polymer. Separate portions of each bracket, such as a first bracket part and a second bracket part, may be formed from the same material or from different materials. In some cases, the bracket(s) or parts thereof may be formed of a shock-absorbing material. The bracket may be a multi-part bracket having two or more parts that may be joined together. The parts of the bracket may be separably joined, or may be permanently affixed to one another.

Figure 2:
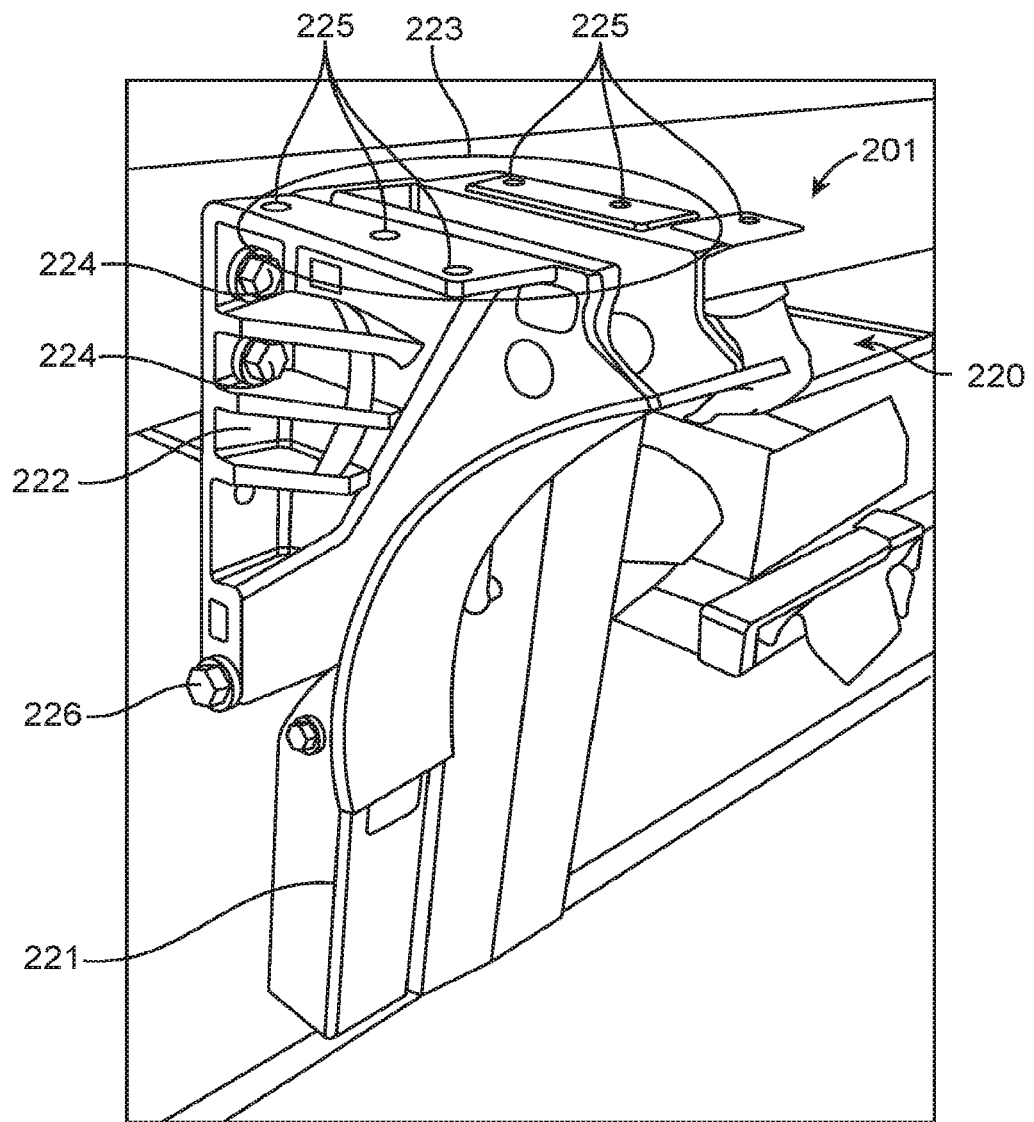
FIG. 2 is a photograph of a drop and go bracket.

FIG. 2 shows an embodiment of a drop and go bracket 220 with two separable bracket parts 221 and 222. The bracket 220 may be mounted to a vehicle frame 201 on a vehicle chassis (e.g., on the side of a truck) in a configuration where the fuel system bracket 221 is attached to a fuel system (not shown) and the chassis bracket 222 is attached to the frame rail 201. The chassis bracket 222 may include pins or interlocking (mating) features 224 that allow the bracket 220 to be installed on the chassis 201. A mating bracket, such as the fuel system bracket 221, may be installed onto the fuel system (e.g., onto a CNG or LNG tank), and may allow the brackets 221, 222 to easily and quickly assemble to each other during mounting. During mounting, the bracket 221 on the fuel system or fuel tank may be connected to the chassis bracket 222 on the chassis 201 by bringing the fuel system bracket 221 together with the chassis bracket 222 such that their mating features engage. The bracket parts may be engaged in a timely manner without requiring any additional adjustment, alignment, dislocation and/or relocation of the chassis 201, thus enabling bracket assembly and fuel system mounting directly on a vehicle production line. The bracket 220 allows the fuel system to easily drop in place in a go-ready configuration.

The bracket 220 may comprise various fasteners, connectors (e.g., nuts and bolts, screws), locks, snap fits, pins, interlocking (mating) features and/or other connecting and/or guiding members. These members may be used to mate and/or connect the bracket 222 to the chassis (e.g., via one or more members 224) and/or the bracket 221 to the fuel system. After the engagement of the brackets 221 and 222, the members may be used to mate and/or connect the bracket 222 with the bracket 221 (e.g., via one or more members 226), the bracket 221 to the chassis and/or the bracket 222 to the fuel system. Further, one or more members 225 may be provided to connect a structural member (not shown) to the region 223 of the assembled bracket 220. The structural member may be, for example, a single plate, or one or more additional brackets. The structural member may be attached using any of the connecting and/or guiding members herein. Springs, tension cords, elastics and or other variable compression parts may be used to provide connecting means on the bracket 220. In some cases, the members may be removably connected, such as, for example, when using nuts and bolts. Alternatively, the members may be permanently connected, such as, for example, when sealed by glue, heat seal or melting, soldering, brazing, deformation of mating features and/or other means. The connecting and/or guiding members may be provided directly on the brackets 221, 222 (e.g., mating features). Separate connecting and/or guiding members may be provided to interface with connecting and/or guiding members on the brackets (e.g., a nut and bolt interfacing with apertures on the brackets).

In alternative embodiments of the invention, additional numbers of bracket parts may be provided. For example, three, four, five, six or more bracket parts may be provided. The bracket parts may engage and/or be connected with each other using one or more of the connecting and/or guiding members described herein. The bracket parts may or may not be engaged/connected prior to mounting of the fuel system to the vehicle chassis. For example, at least two bracket parts may be engaged/connected while a third and a fourth bracket part may be engaged with one or both of the preceding parts during mounting. In another example, all bracket parts may be engaged/connected during mounting. In yet another example, all but two parts (which may be composite parts) may be engaged/connected prior to mounting, and so forth in a variety of other combinations.

Some embodiments of the invention may provide one or more means for mounting the fuel system to the vehicle in addition to the drop and go bracket. For example, the drop and go bracket may be used to mount the fuel system to the vehicle on the production line. At a later time, the fuel system and the vehicle may be connected using additional connectors and/or other brackets.

The connecting and/or guiding members may be formed from the same material as the rest of the bracket or from different materials. For example, one or more fasteners may be formed from a stronger steel material than one or more of the bracket parts, which may be formed of a different steel material or of a more lightweight material such as aluminum or composite. One or more connecting and/or guiding members may be formed of shock-absorbing material. In some instances, break-away pins or other members may be formed of a more breakable material than the rest of the bracket. The break-away pins may be formed of a more brittle material, weaker material, fatigued material, or may have any other characteristic relative to the other bracket parts. The connectors may be designed to break upon impact. Systems and methods provided herein may be combined with or modified by other systems and methods, such as systems and methods provided in U.S. Provisional Patent Application Ser. No. 61/612,878 ("BREAK-AWAY BRACKET"), filed Mar. 19, 2012, which is incorporated herein by reference in its entirety.

Figure 3:
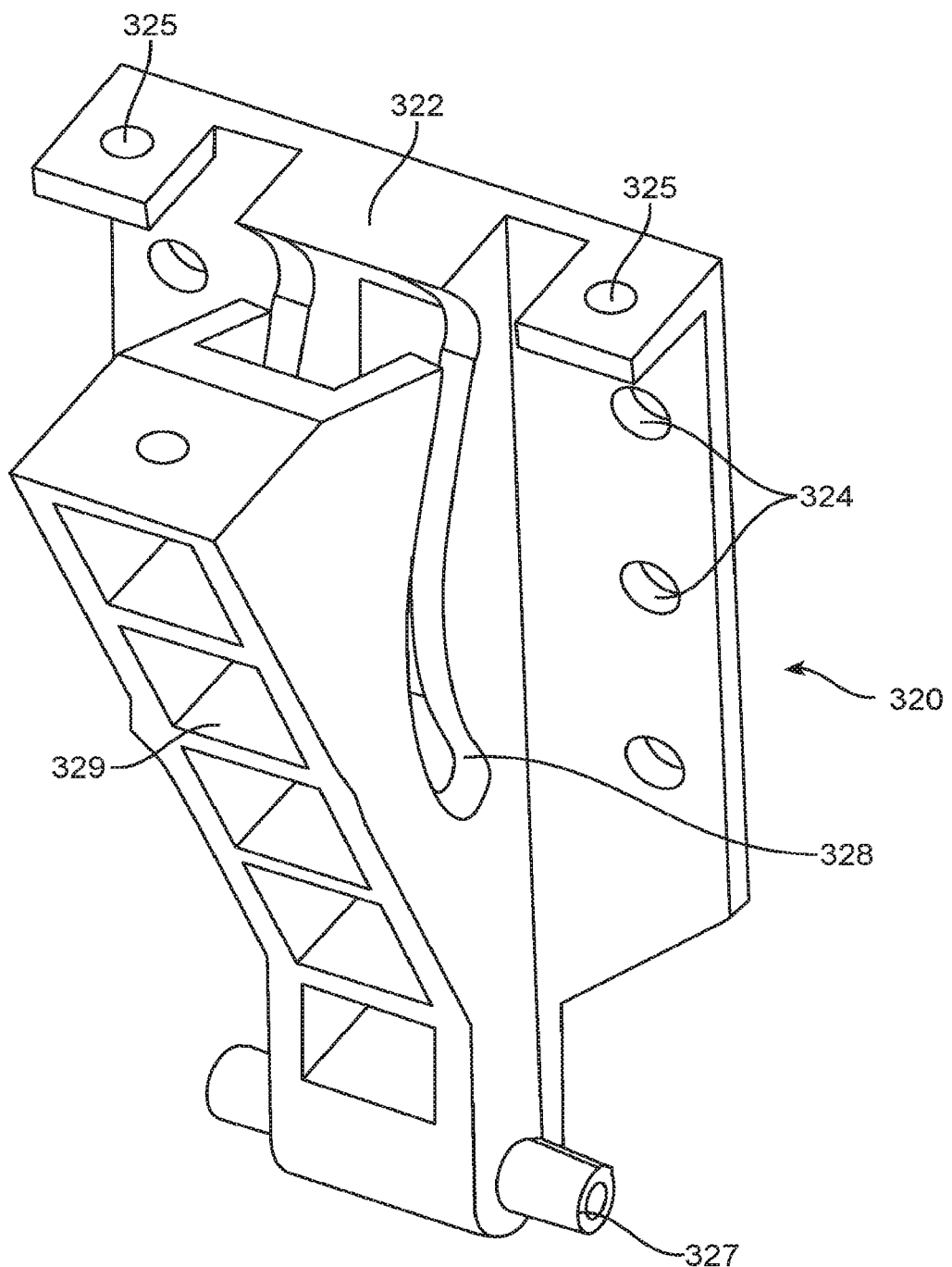
FIG. 3 is a perspective view of a chassis bracket of a drop and go bracket.

FIG. 3 is a perspective view of a chassis bracket 322 of a drop and go bracket. The chassis bracket 322 may be integrally formed, formed of one or more parts connected together in a permanent or removable fashion and/or a combination thereof. The chassis bracket may comprise various connecting and/or guiding members, such as, for example, members 324, 325, 327 and 328. In one embodiment, the members 324 may be used to secure the chassis bracket to a chassis using one or more nuts and bolts or other connecting and/or guiding members described herein. The members 325 may be used to connect a plate (not shown) to the chassis bracket 322 and a mating system bracket after the two have been engaged. Embodiments of the invention may only require the plate or portion to be connected in a single location positioned in a top portion of the engaged brackets (e.g., region 223 in FIG. 2). For example, only a top bolted portion may be provided. Some embodiments of the invention may or may not provide bolted or otherwise connected portion in multiple locations.

Members 327, 328 may be provided to guide and/or interlock with mating members provided on the fuel system bracket. The groove 328 may vary in length or profile to achieve a desired path of the mating components. For example, the circular member 327 may slidingly engage and a semicircular or ellipsoidal feature on the system bracket. The two mating features may slide into a position where they interlock. In another example, the groove member 328 may guide and engage with a mating member, such as a pin, provided on the system bracket. The pin may move in the groove 328 to an end position. In some cases, features may be provided on the members 327, 328 and/or mating members on the system bracket to allow for the mating parts to click or interlock in place in the end position. The interlock may be permanent or reversible. For example, the mating parts may interlock such that dislocation is not possible without application of a predetermined amount of force. Embodiments of the invention may also provide mating features to complement each other to lock the brackets in place with respect to each other. For example, engagement of the circular pin member 327 with a mating member (e.g., circular cutout shape) on the system bracket may restrict the relative movement of the brackets such that when a mating member (e.g., a pin) on the system bracket engages with groove member 328, the brackets may not be movable with respect to each other than in one or more predetermined directions. Such mutual restraint may be particularly beneficial in the end (fully engaged) positions of the guiding members.

The chassis bracket 322 may further comprise one or more structural members 329. Such members may be integrally formed with one or more parts of the chassis bracket, may be connected to the chassis bracket or a combination thereof. The structural member 329 may have a functionality that lightweights the chassis bracket. For example, as shown in FIG. 3, the structural members 329 may be a series of plates or steps. In another example, a honeycomb structure may be provided such that a lightweight but strong (e.g., impact resistant) structure is obtained. The member 329 may also be used as a connecting and/or guiding member. For example, it may lock in with complementary features provided on the system bracket.

Figure 4:
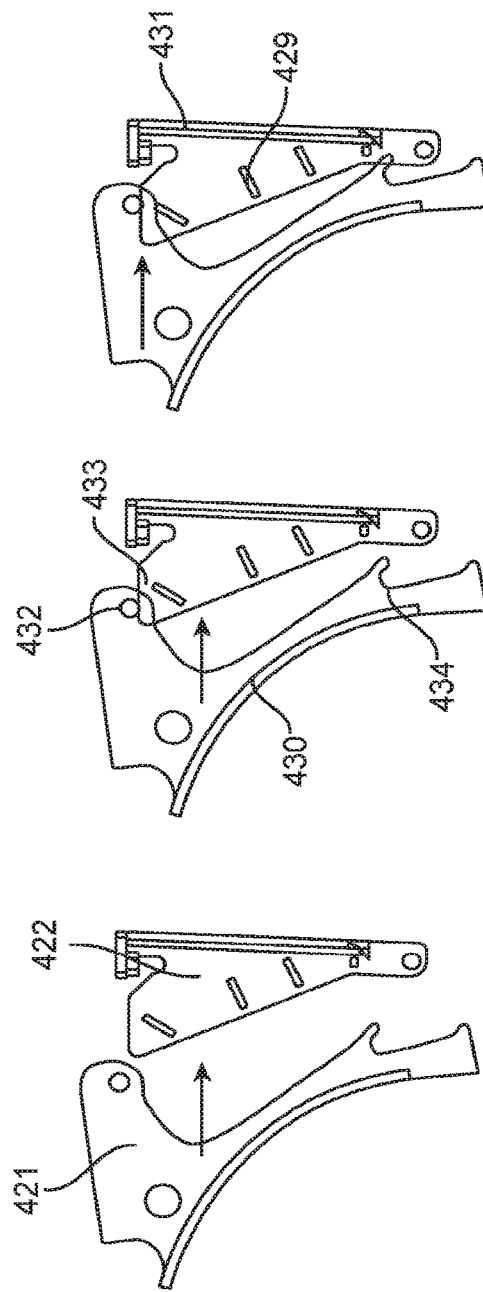
FIG. 4A, FIG. 4B, FIG. 4C, FIG. 4D, FIG. 4E, FIG. 4F, and FIG. 4G schematically show a sequence of steps during engagement of a chassis bracket with a system bracket.

FIGS. 4A-G FIG. 4A, FIG. 4B, FIG. 4C, FIG. 4D, FIG. 4E, FIG. 4F, and FIG. 4G schematically show a sequence of steps during engagement of a chassis bracket 422 with a fuel system bracket 421. A close-tolerance fit of the brackets 421, 422 may be maintained by installation tooling. The fuel system bracket 421 may be mounted to a fuel system or fuel tank, for example via surface 430, and may be moved in a direction toward the chassis bracket 422 as shown. The chassis bracket 422 may be mounted to a vehicle chassis, for example via surface 431, and may be kept stationary during mounting. The bracket 421 may be moved in the indicated direction such that a member 432 (e.g., a pin) on bracket 421 engages with bracket 422 along a surface 433. The bracket 421 may continue to move along surface 433 to a position where member 432 encounters a groove member 428 (FIG. 4D). Meanwhile, cutout member 434 on the bracket 421 may be brought in proximity of pin member 427 on the bracket 422 as a result of the movement of the bracket 421 toward the bracket 422.

Next, the member 432 may move or slide in the groove member 428 such that the two brackets are brought further together along multiple directions, as illustrated by the arrows in FIG. 4E and FIG. 4F, bringing members 434 and 427 in closer proximity and alignment. As shown in FIG. 4F, when the member 432 approaches its end position within the groove 428, the members 434 and 427 may engage. Further alignment and final positioning of the brackets may result in the configuration shown in FIG. 4G, wherein the member 432 has reached its final position with respect to groove 428, and the cutout 434 has been situated on the pin 427. As described elsewhere herein, engagement of the brackets 421, 422 may not be limited to the members/surfaces 432, 433, 428 and 434, 427.

In some instances, a multi-point connection may be provided. For example, when the brackets 421, 422 are brought together, an upper point of connection 432 and a lower point of connection 427 can be provided. Such multiple points of connection can provide additional stability to the connection of the fuel system to the vehicle chassis. Any number or placements of points of connection may be provided. In some instances, the connections may be provided via pin and cutout member as illustrated. Alternatively, any interlocking mechanism may be used to provide connections.

Optionally, when the two parts are fully engaged, the weight of the fuel system may pull down the fuel system bracket 421. The brackets may be held together via gravity. The interlocking features of the brackets may prevent the brackets from substantially moving relative to one another in a lateral or up-and-down direction. In some instances, when the parts are engaged, the movement between the brackets will be restricted along one, two or three axes of motion. For example, the brackets do not substantially move relative to one another in a purely lateral direction (e.g., fuel system toward or away from vehicle, or side shifting between the fuel tank and the vehicle). Optionally, the brackets do not substantially move relative to one another in a purely vertical direction (e.g., up and down relative to a surface upon which the vehicle rests). In some instances, a combination of motions in both a lateral and vertical direction, rotation of one bracket relative to another, or twisting may be required to separate the brackets once engaged. Once the parts are engaged, an additional attachment mechanism may be used to keep the brackets in place and prevent them from slipping apart.

Once the two parts engage, a top plate (not shown) may be bolted or otherwise fastened on a surface 423 so that the brackets 421 and 422 do not bounce up and out as indicated in FIG. 4G. Further, the various connecting members (e.g., nuts and bolts holding the body of the brackets 421 and 422 together and not identical to the top plate) may be used to secure the brackets together. One or more other connecting members may be used prior to connecting the top plate, concurrently with connecting the top plate and/or after connecting the top plate. In some embodiments, only the top plate may be used to secure the brackets, without requiring plates or connectors to be provided from any other side or direction of the drop and go bracket.

The multi-part drop and go bracket configuration may permit a fuel system to be mounted onto a vehicle using very few distinct parts. For example, the brackets may already be mounted onto a fuel system and chassis respectively. The brackets may engage with one another. A top plate or other attachment mechanism may be used to secure the brackets. In some instances, only, 2, 3, 4, 5, 6, 7, 8, 9, or 10 separate pieces may be used during the mounting of the fuel system to the vehicle.

FIG. 6A, FIG. 6B, FIG. 6C, and FIG. 6D illustrate an alternative bracket design. A fuel system bracket 600 configured to attach to a vehicle fuel system is shown. The fuel system bracket may have a curved surface 602 configured to engage or accommodate a curved surface of a fuel tank. The fuel system bracket may also have a shaped surface 610 configured to come into contact with a chassis bracket. The shaped surface may be provided to be complementary to a profile of the chassis bracket. Thus, when the fuel system bracket is engaged with the chassis bracket, the side 612 of the bracket may lie flush against the surface to which the chassis bracket is attached.

The fuel system bracket 600 may have one or more interlocking feature configured to mate with one or more corresponding feature of the chassis bracket. For example, one or more holes 620 or indentations may be provided. The fuel system bracket may have a top lip 622. The underside of the top lip may be smooth or may include an overhanging feature that may be configured to hook over one or more feature from the chassis bracket. For example, a protrusion may be provided to be inserted into an indentation or hole of the chassis bracket. The underside of the top lip or surface of the fuel system bracket may have an indentation or hole configured to accept a protrusion or other feature from the chassis bracket. The brackets may be configured to hook together.

A fuel system bracket may have an interior surface 645 capable of contacting and/or mating with a portion of the chassis bracket. When weighted with a vehicle fuel system, the fuel system bracket interior surface may rest against a surface of the chassis bracket and provide additional support or stability. For example, a hole may be provided in the interior surface that may align with a hole or protrusion of the portion of the chassis bracket. The interior surface may be slanted at a non-orthogonal angle relative to the vehicle chassis surface when mounted.

The fuel system bracket may include one or more holes 630 or other features that may permit the fuel system bracket to be attached to a vehicle fuel system. For example, one or more fastener or other fastening techniques described elsewhere herein may be used to attach the fuel system bracket to the vehicle fuel system. The fuel system bracket may be attached to the vehicle fuel system prior to being engaged with a chassis bracket.

Figure 6A:
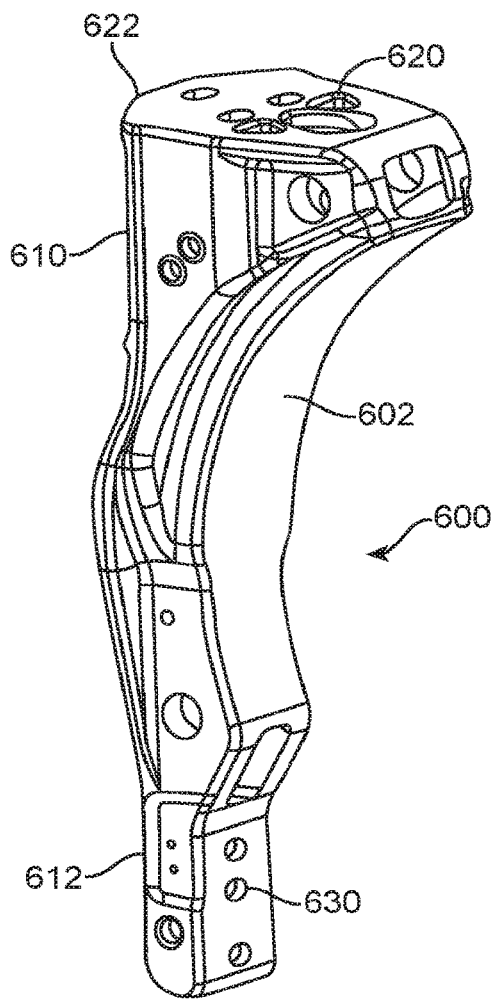
FIG. 6A shows a front perspective view of a fuel system bracket.

FIG. 6A shows a front perspective view of the fuel system bracket 600. A side configured to interface with the fuel system 602 may be curved or configured to complement the shape of the fuel system cover or a fuel tank.

Figure 6B:
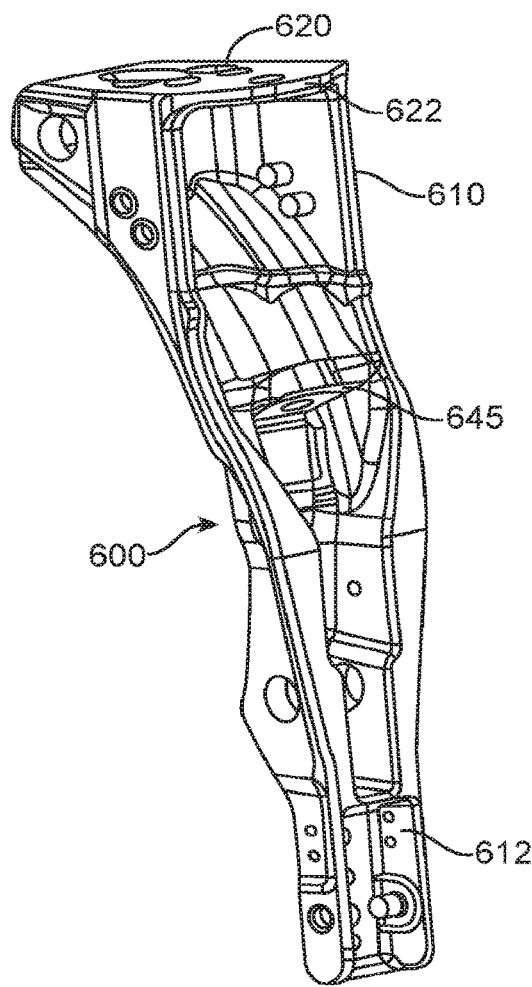
FIG. 6B shows a rear perspective view of the fuel system bracket.

FIG. 6B shows a rear perspective view of the fuel system bracket 600. A side configured to interface with a chassis bracket 610 may be shaped to complement or accommodate the shape of the vehicle chassis bracket. The side configured to interface with the chassis bracket may be opposite the side configured to interface with the fuel system. An interior surface 645 may be integrally formed as part of the bracket. The interior resting surface may be provided as a ridge, solid piece, tab, or have any other configuration.

Figure 6C:
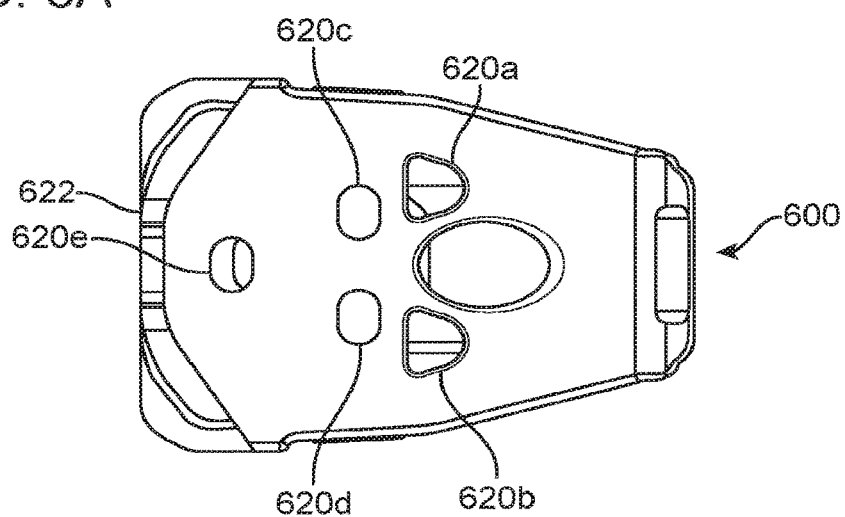
FIG. 6C shows a top view of the fuel system bracket.

FIG. 6C shows a top view of the fuel system bracket 600. The fuel system bracket may have one or more features, such as holes 620a, 620b, 620c, 620d, 620e, indentations, or protrusions. The features 620a, 620b may mate or interlock with corresponding features in a chassis bracket. The features may provide through holes 620c, 620d, 620e in conjunction with the chassis bracket for through holes. The features may have different shapes and/or dimensions from one another or may have matching shapes and/or dimensions. For example, the interlocking features may be substantially circular, elliptical, semi-circular, crescent shaped, rectangular, trapezoidal or have any other shape.

Figure 6D:
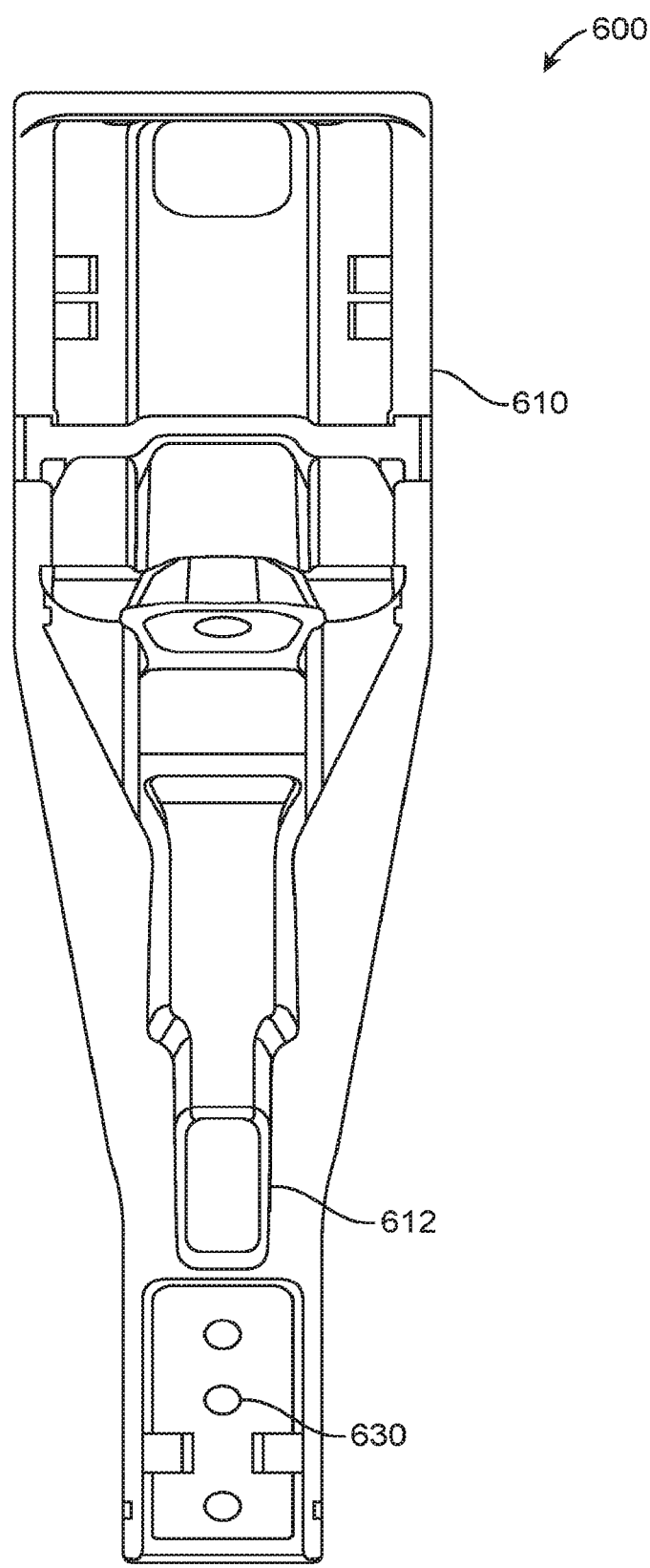
FIG. 6D shows a rear view of the fuel system bracket.

FIG. 6D shows a rear view of the fuel system bracket 600.

FIG. 7A, FIG. 7B, FIG. 7C, and FIG. 7D illustrate an alternative bracket design. A chassis bracket 700 configured to attach to a vehicle chassis is shown. The chassis bracket may have a flat surface 702 configured to rest against a surface of a vehicle chassis. The chassis bracket may also have a shaped outer surface 710 configured to come into contact with a fuel system bracket. The shaped surface 710 may engage with a complementary shaped profile 610 of the fuel system bracket. Thus, when the fuel system bracket is engaged with the chassis bracket, a substantially flat surface may be formed by the chassis bracket surface 702 and the fuel system bracket 612.

The chassis bracket 700 may have one or more interlocking feature configured to mate with one or more corresponding feature of the fuel system bracket. For example, one or more protrusions 720 may be provided. The chassis bracket may have a top surface 722. The topside of the top surface may be smooth or may include other features such as protrusions, indentations or holes 724 that may be configured to mate with complementary portions of the fuel system bracket. For example, a protrusion 720 may be provided to be inserted into an indentation or hole 620 of the fuel system bracket.

The chassis bracket may include one or more holes 730 or other features that may permit the chassis bracket to be attached to a vehicle chassis. For example, one or more fastener or other fastening techniques described elsewhere herein may be used to attach the chassis bracket to the vehicle chassis. The chassis bracket may be attached to the vehicle chassis prior to being engaged with a fuel system bracket.

Figure 7A:
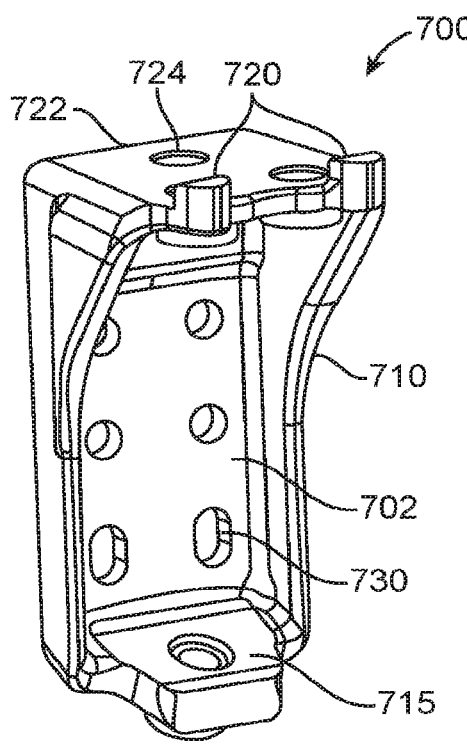
FIG. 7A shows a front perspective view of a chassis bracket.

FIG. 7A shows a front perspective view of the chassis bracket 700. A side configured to interface with the fuel system bracket 712 may be curved or configured to complement the shape of the fuel system bracket. The chassis bracket may include a lower portion 715 that may be configured to contact or mate with an interior surface 645 of the fuel system bracket. The lower portion of the chassis bracket may be slanted to be non-orthogonal relative to the surface 702 configured to contact the chassis.

Figure 7B:
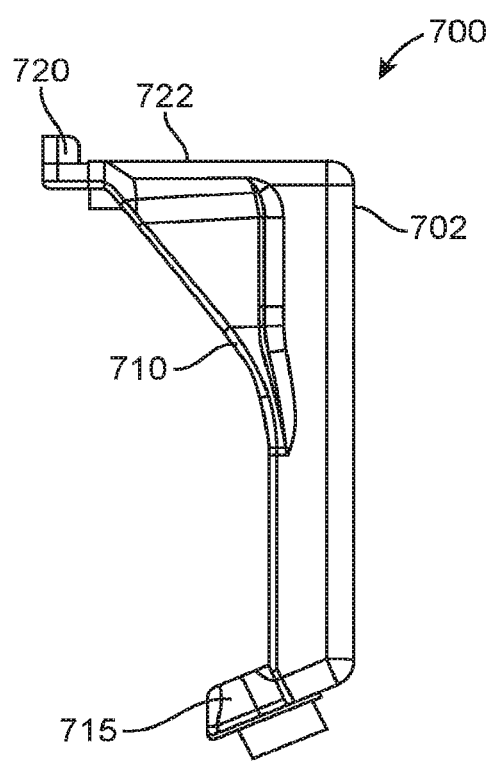
FIG. 7B shows a side view of the chassis bracket.

FIG. 7B shows a side view of the chassis bracket 700. The chassis bracket may have one or more shaped features such as protrusions 720, holes, or indentations configured to mate with or interlock with a feature of the fuel system bracket. Optionally, the lower portion 715 of the chassis bracket may include one or more features, such as protrusions, holes, or indentations. This may permit the lower portion of the chassis to mate with or interlock with an interior surface 645 of the fuel system bracket, and/or may provide an aligned through-hole with a through-hole of the fuel system bracket.

Figure 7C:
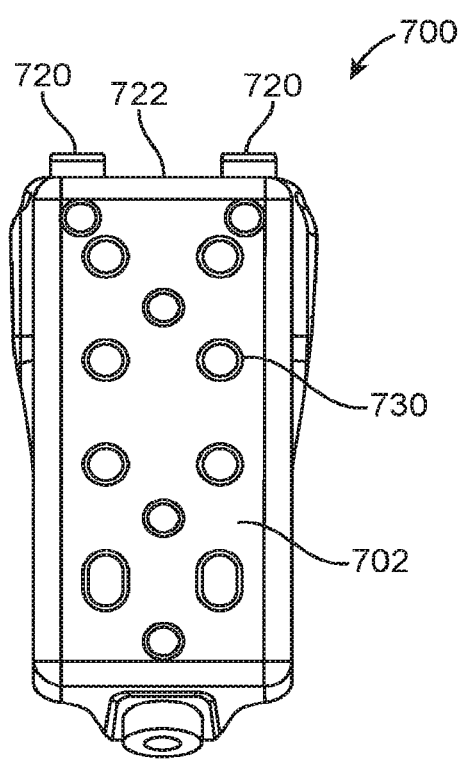
FIG. 7C shows a rear view of the chassis bracket.

FIG. 7C shows a rear view of the chassis bracket 700. A rear surface 702 of the chassis bracket may be configured to contact a vehicle chassis, frame, or other surface. The chassis bracket may include one or more through-holes 730 or other features that may permit the chassis bracket to be connected to the chassis.

Figure 7D:
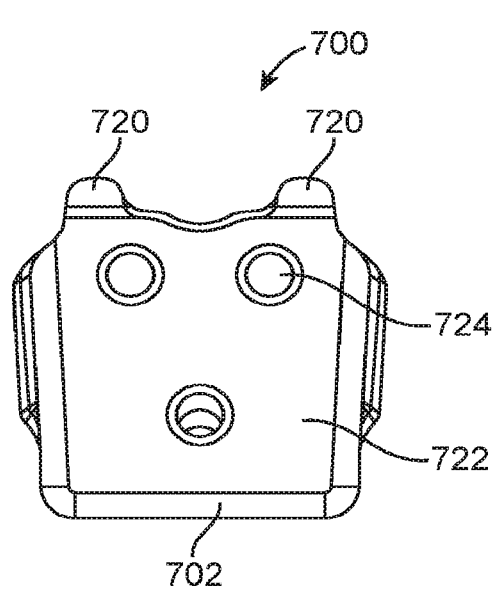
FIG. 7D shows a top view of the chassis bracket.

FIG. 7D shows a top view of the chassis bracket 700. The top surface 722 of the chassis bracket may be configured to contact an upper interior surface of the fuel system bracket. One or more protrusions (upper hook) 720 of the chassis bracket may pass through a through-hole 620a, 620b of the fuel system bracket. One or more holes 724 of the chassis bracket may be aligned with through-holes 620c, 620d, 620e of the fuel system bracket. A fastener or other component may pass through the aligned through-holes.

FIG. 8A, FIG. 8B, FIG. 8C, FIG. 8D, FIG. 8E, FIG. 8F, FIG. 8G, and FIG. 8H illustrate an example of a fuel system bracket 800 engaged with a chassis bracket 850. The fuel system bracket may be configured to attach to a vehicle fuel system and the chassis bracket may be configured to a vehicle chassis, frame, or surface.

The brackets 800, 850 may be attached by mechanically mating and/or interlocking portions. In some instances, the brackets may be rotated relative to one another in order to engage. Once the brackets are engaged with one another, they may be substantially fixed relative to one another in a lateral and/or vertical direction. In some embodiments, once the brackets are engaged, they may not be movable relative to one another without rotating at least one of the brackets relative to another around an axis of rotation. In some embodiments, once the brackets are engaged, they may not be separable from one another via a purely translational motion.

In some embodiments, the fuel system bracket 800 may have an overhanging lip or extension 822. The top surface 862 of the chassis bracket 850 may contact the underside of the overhanging lip or extension of the fuel system bracket. A portion of the chassis bracket may be inserted into a portion of the fuel system bracket. For example, some side walls of the fuel system bracket may surround or cover a portion 865 of the chassis bracket.

The fuel system bracket 800 may include one or more holes 820. The one or more holes may be configured to accept one or more complementary protrusions 870 from the chassis bracket. The one or more protrusions may hook into the holes of the fuel system bracket and prevent the fuel system bracket 800 from moving laterally and/or vertically with respect to the chassis bracket 850. In alternative embodiments, the fuel system bracket may have one or more protrusions that may fit and/or hook into one or more holes or indentation of a chassis bracket. The protrusion may optionally pass completely through the hole. The protrusion may or may not extend beyond the hole.

In some instances, a bottom surface 878 of the chassis bracket may be configured to contact with and/or engage with an interior surface 845 of the fuel system bracket. The bottom surface and the interior surface may be parallel or substantially parallel to one another when engaged. The bottom surface and/or interior surface may be slanted relative to the chassis bracket back surface 852. In some embodiments, the bottom surface and/or the interior surface may be at a non-orthogonal angle relative to the chassis bracket back surface. The bottom surface 878 and/or the interior surface 845 being in contact may assist with keeping the brackets engaged with one another and may serve as an additional point of contact. In some embodiments, the bottom surface and/or the interior surface may have through-holes. The through-holes may align when the brackets are engaged with one another. In some instances, a fastener may pass through the aligned through-holes. The fastener may just pass through the aligned through-holes and additional holes (e.g., at the top surface of the fuel system bracket).

A back surface of the fuel system bracket 812 may be coplanar or substantially coplanar with a back surface of the chassis bracket 852. The back surface of the fuel system bracket and/or the back surface of the chassis bracket may be configured to contact and/or engage with a vehicle chassis, frame, or surface. One or more through-holes 830 of the fuel system bracket and/or the chassis bracket may aid in the fastening of the brackets to the vehicle chassis. Alternatively, the one or more through-holes of the fuel system bracket may aid in the fastening of the fuel system bracket 800 to the fuel system.

In some instances, one or more through-holes of the fuel system bracket and the chassis may align with one another. For example, an opening 840 of the fuel system bracket may align with one, two or more holes 880 of the chassis bracket. Such alignment may occur in a lateral direction. In another example, one or more top openings of the fuel system bracket 820c, 820d, 820e may align with one or more top holes 875 of the chassis bracket. One or more fastener (e.g., screw, pin) may pass through aligned holes. In examples, an additional top plate may be provided over the top surfaces of the brackets 824, 862. The plate may be attached to the brackets via one or more fasteners that may pass through the top plate and/or aligned top holes of the bracket. Alternatively, no top plate is needed and the fasteners may pass through the aligned top holes of the bracket.

The fuel system bracket 800 may have a curved surface 802 configured to engage with a vehicle fuel system. The curved system may contact or be complementary in shape to a fuel system cover and/or fuel tank.

The brackets 800, 850 may be configured so that they can be attached to the respective vehicle parts prior to being engaged. For example, fuel system bracket 800 may be attached to a vehicle fuel system. The chassis bracket 850 may be attached to the vehicle chassis. Such attachments may occur via fasteners passing through one or more through-holes 830, 880, adhesives, welding, soldering, interlocking mechanisms, rivets, or any other fastening technique. The pre-fastened brackets may be brought into engagement with one another. For example, a vehicle fuel system with an attached bracket may be lifted and mounted onto a vehicle chassis via engagement of the fuel system bracket and the chassis bracket. In some instances, a portion of the fuel system bracket may be lifted up over a portion of the chassis bracket and then brought down to settle on the chassis bracket with aid of gravity. In some instances, a combination of a top mating feature (e.g., protrusion of one of the brackets being inserted into an indentation or hole of the other bracket, and rear surface 812 of the fuel system bracket resting against a surface, such as a vehicle chassis, may keep the brackets engaged even without requiring additional fasteners or attachment techniques. Once the brackets are engaged, additional fasteners or attachment techniques may be employed to keep the brackets together, and permit the fuel system to remain mounted on the vehicle, even when the vehicle is in motion.

Figure 8A:
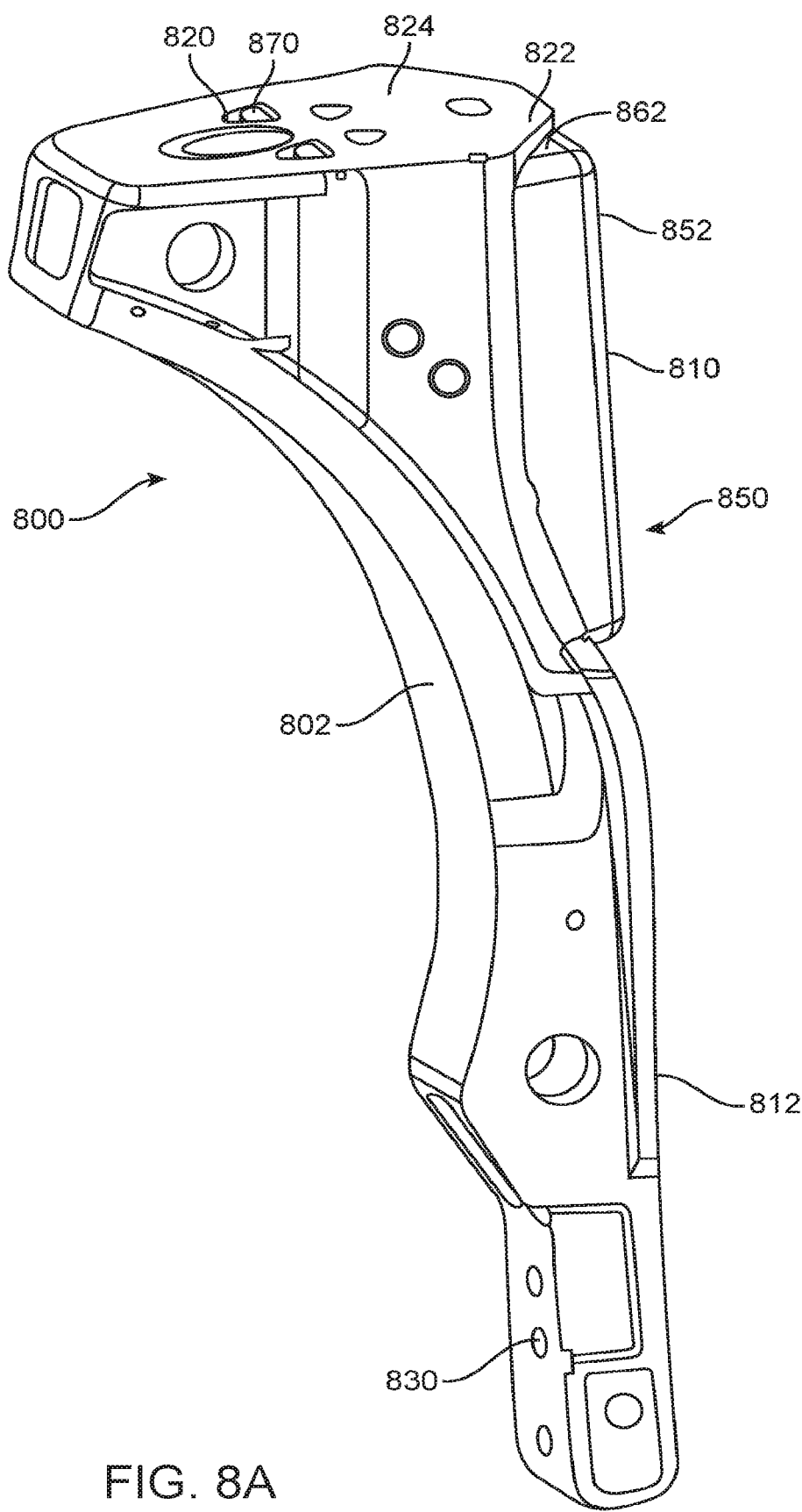
FIG. 8A shows a side-front perspective view of a fuel system bracket engaged with a chassis bracket.

FIG. 8A shows a side-front perspective view of a fuel system bracket 800 engaged with a chassis bracket 850. The chassis bracket may be partially inserted into a portion of the fuel system bracket. Part of the chassis bracket may remain exposed. A backside 852 of the chassis bracket may be substantially coplanar with bottom back surface of the fuel system bracket 812. A top surface 862 of the chassis bracket may be provided under an upper surface 824 of the fuel system bracket. A lip 822 of the fuel system bracket may overly a portion of the top surface of the chassis bracket. The fuel system bracket may have one or more holes 820. Protrusions 870 of the chassis bracket may be inserted into one or more of the holes.

Figure 8B:
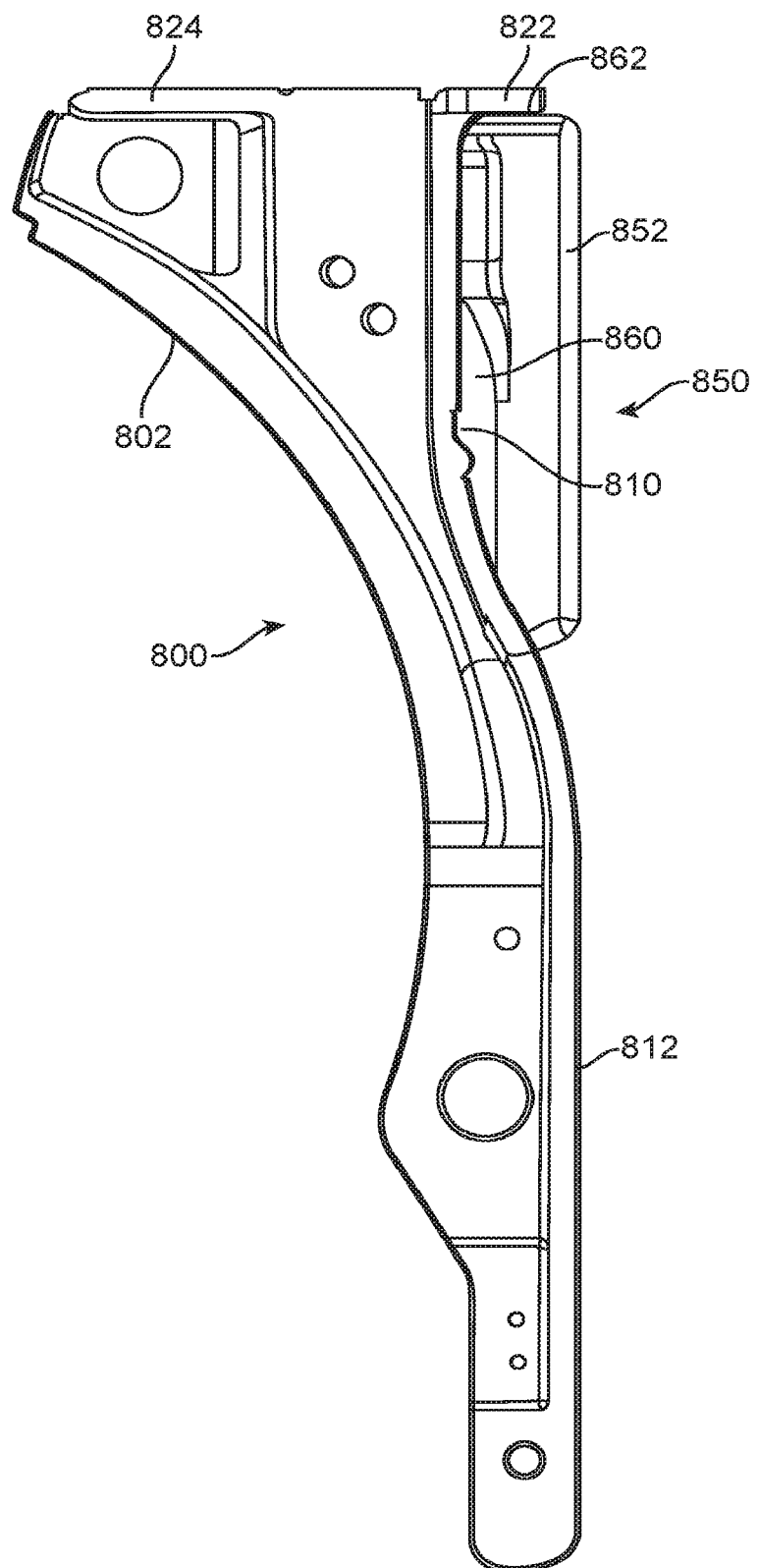
FIG. 8B shows a side view of the fuel system bracket engaged with the chassis bracket.

FIG. 8B shows a side view of a fuel system bracket 800 engaged with a chassis bracket 850. In some embodiments, a backside 852 of the chassis bracket and a bottom back side 812 of the fuel system bracket may be configured to contact a vehicle chassis. An upper back side 810 of the fuel system bracket may have a shape to accommodate a front side 860 of the chassis bracket. A gap may or may not be provided between the upper back side of the fuel system bracket and the front side of the chassis bracket.

Figure 8C:
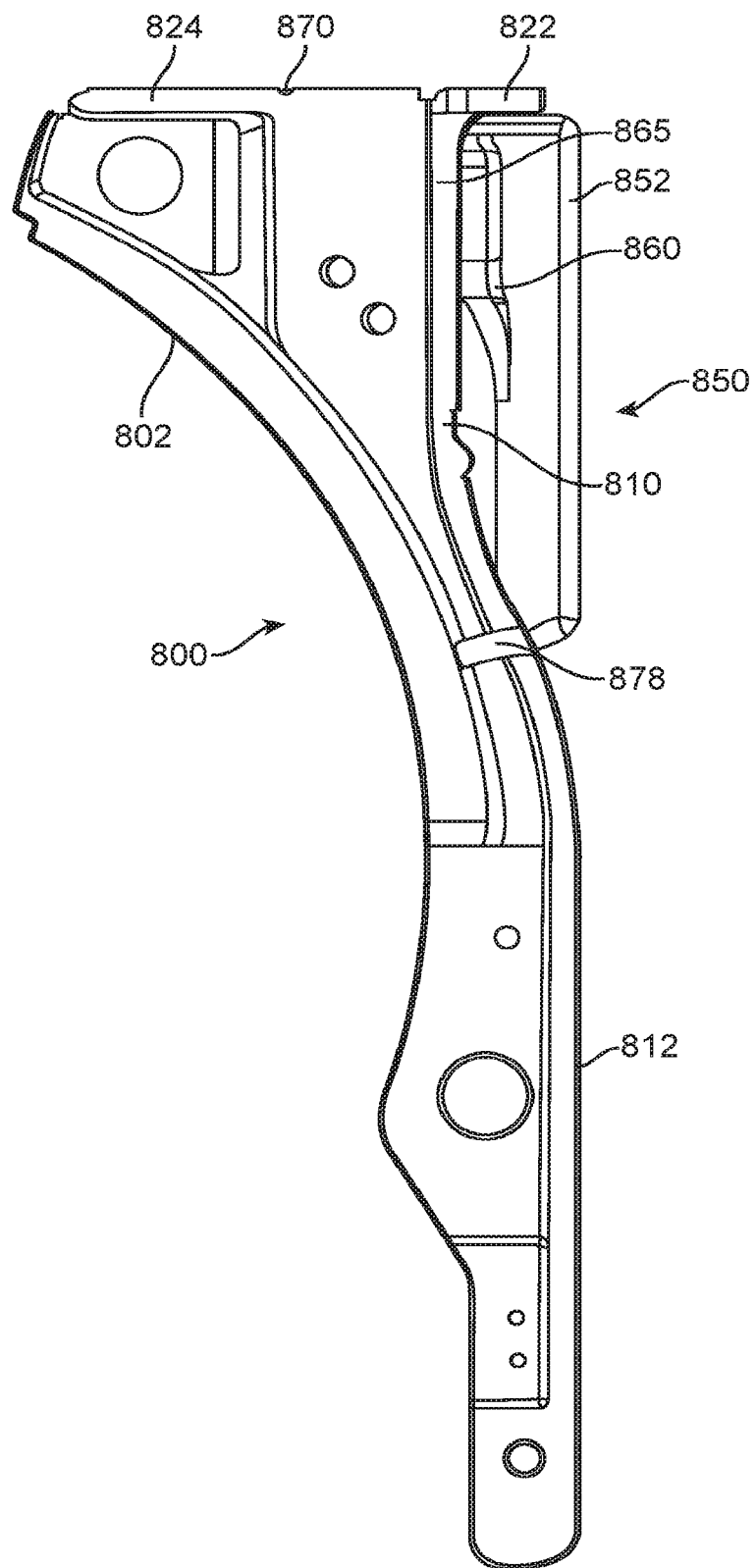
FIG. 8C shows a side view of the fuel system bracket engaged with the chassis bracket.

FIG. 8C shows a side view of a fuel system bracket 800 engaged with a chassis bracket 850 along with some indicators of overlap between the fuel system bracket and the chassis bracket. A portion of the chassis bracket 865 may be inserted into a portion of the fuel system bracket. Some portions of the side walls of the fuel system bracket may overlap some portions of side walls 865 of the chassis bracket. A portion of the top surface of the chassis bracket may pass beneath an upper surface of the fuel system bracket, and protrusions may be provided at the end of the top surface fo the chassis bracket. The protrusions 870 may pass through one or more holes of the fuel system bracket. A lower surface 878 of the chassis bracket may be inserted into an interior portion of the fuel system bracket.

Figure 8D:
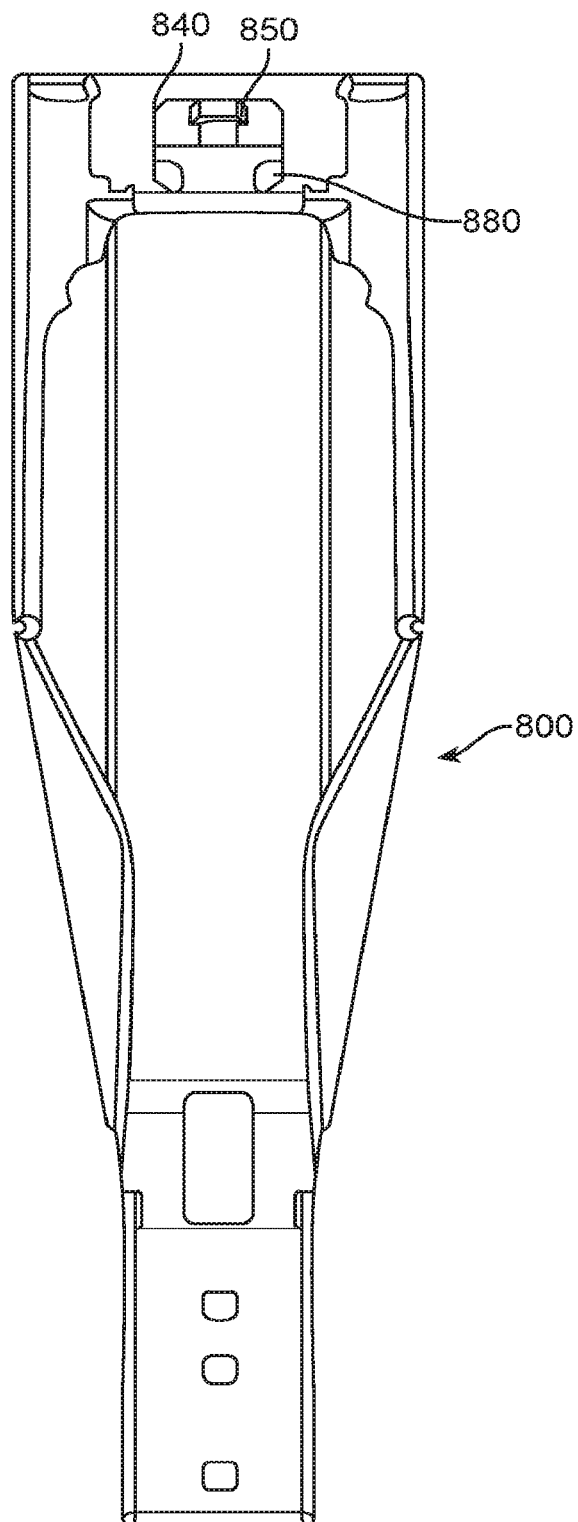
FIG. 8D shows a front view of the fuel system bracket engaged with the chassis bracket.

FIG. 8D shows a front view of the fuel system bracket 800 engaged with the chassis bracket 850. One or more through-hole 800 of the chassis bracket may be viewable and/or accessible via an opening 840 of the fuel system bracket. Optionally, a fastener or other object may pass through the opening and the through-holes.

Figure 8E:
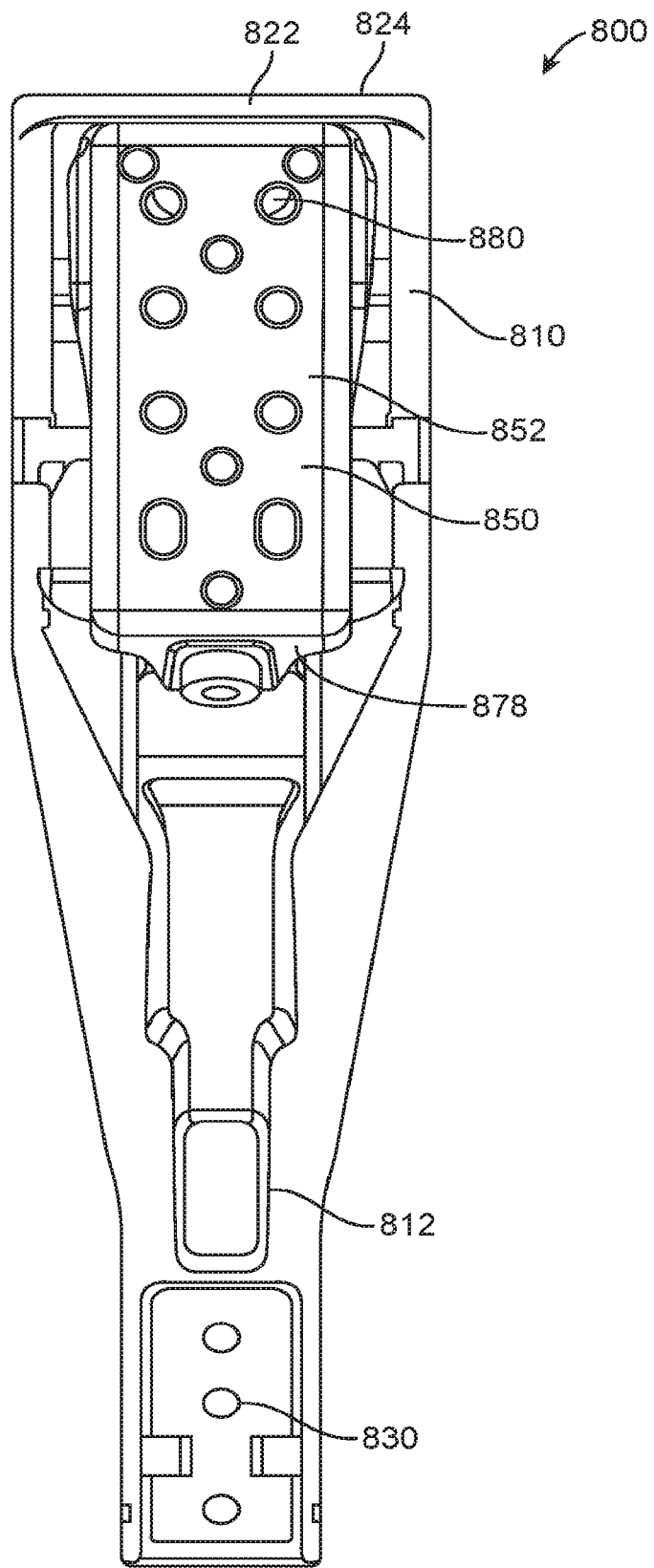
FIG. 8E shows a rear view of the fuel system bracket engaged with the chassis bracket.

FIG. 8E shows a rear view of the fuel system bracket 800 engaged with the chassis bracket 850. An upper surface 824 of the fuel system bracket may overlie the upper surface of the chassis bracket. This may assist with permitting the fuel system bracket to hook on over the chassis bracket. In a drop and go bracket arrangement, the fuel system bracket may be dropped over the chassis bracket to be initially engaged. The upper rear walls 810 of the fuel system bracket may lie adjacent to the sides of the chassis bracket. The fuel system bracket may be wider than the chassis bracket, thereby permitting a portion of the chassis bracket to be inserted into the fuel system bracket. A lower surface 878 of the chassis bracket may be inserted into a portion of the fuel system bracket.

Figure 8F:
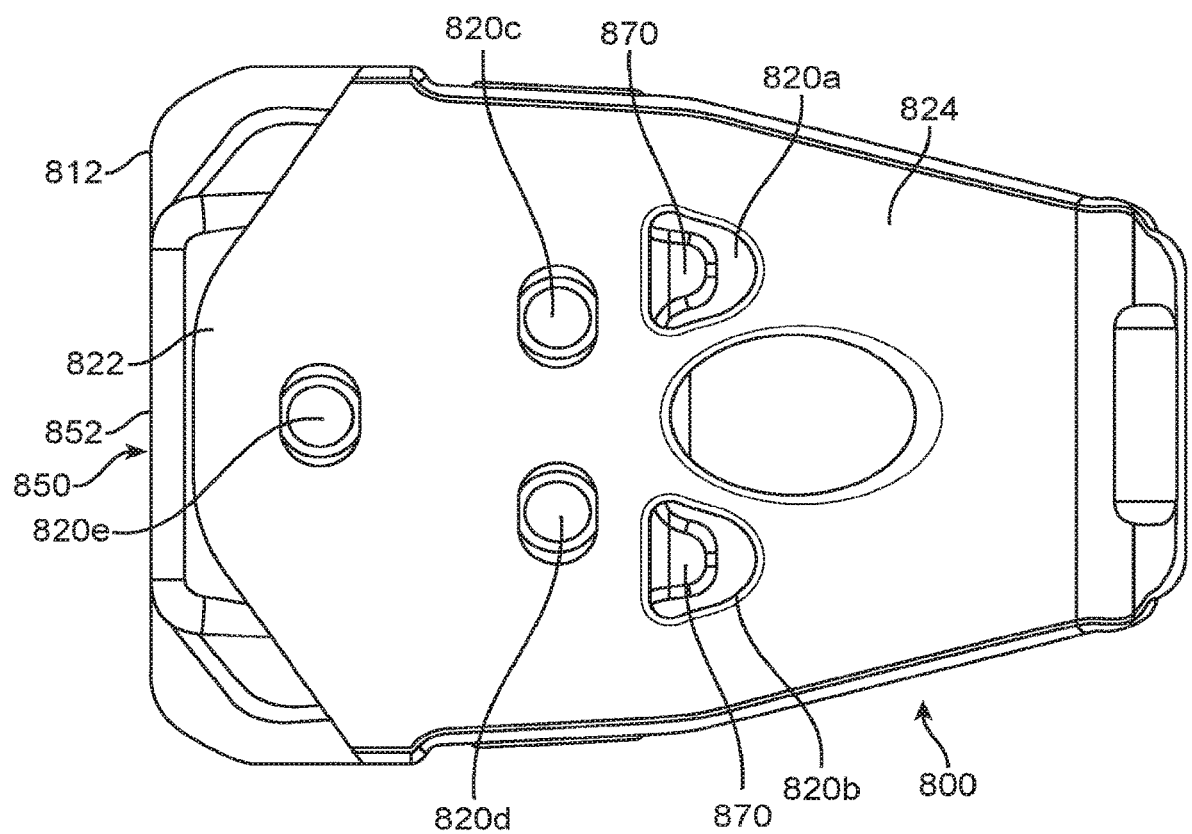
FIG. 8F shows a top view of the fuel system bracket engaged with the chassis bracket 850.

FIG. 8F shows a top view of a fuel system bracket 800 engaged with the chassis bracket 850. The fuel system bracket may have one or more holes 820*a*, 820*b*, 820*c*, 820*d*, 820*e* in its top surface. Optionally, protruding surfaces 870 from the chassis bracket may pass at least partially into the through-holes 820*a*, 820*b*. In some instances, the chassis bracket may have one or more underlying holes that may align with through-holes of the fuel system bracket 820*c*, 820*d*, 820*e*.

Figure 8G:
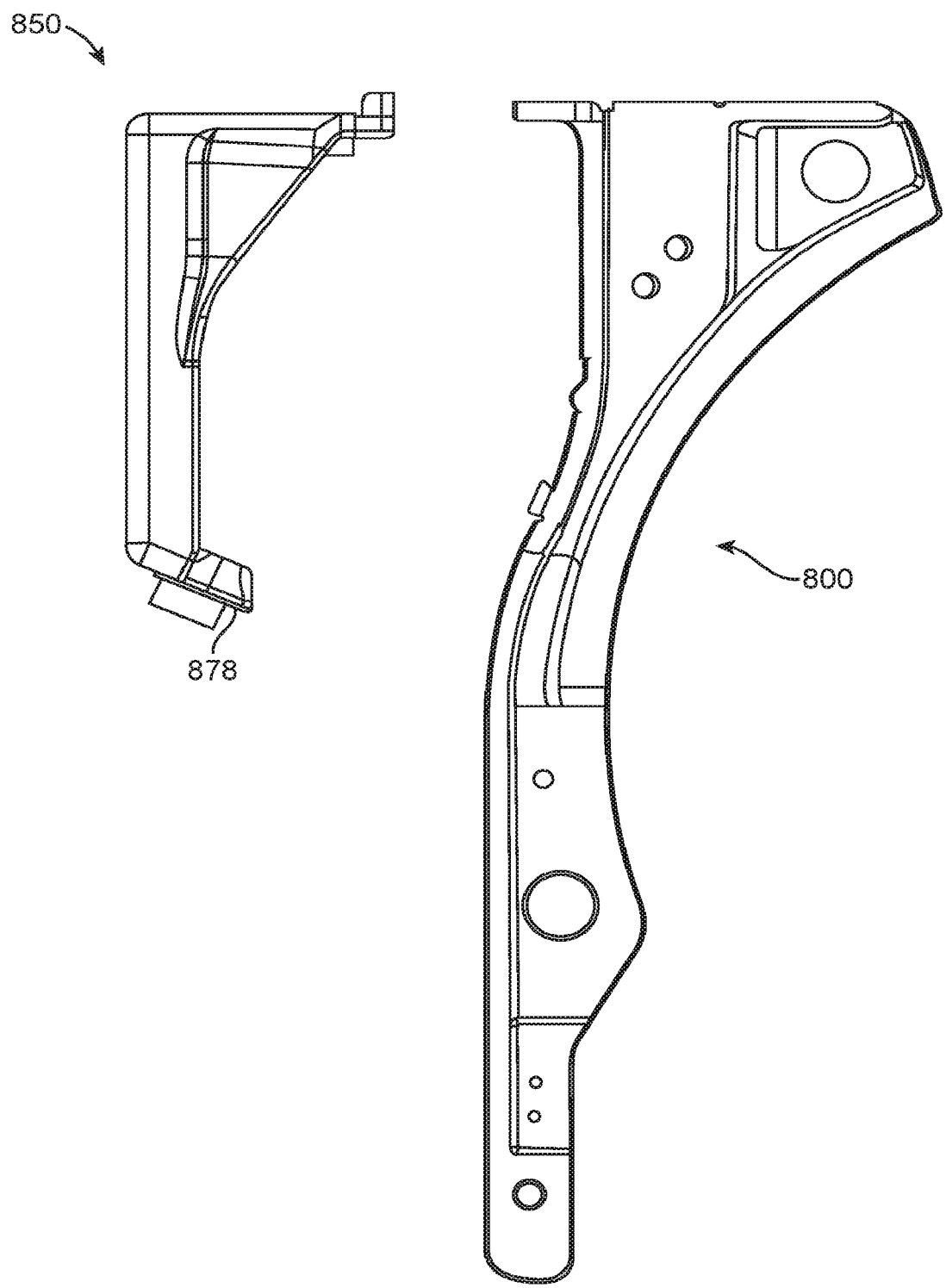
FIG. 8G shows a side view of the separated fuel system bracket and the chassis bracket.

FIG. 8G shows a side view of a separated fuel system bracket 800 and a chassis bracket 850.

Figure 8H:
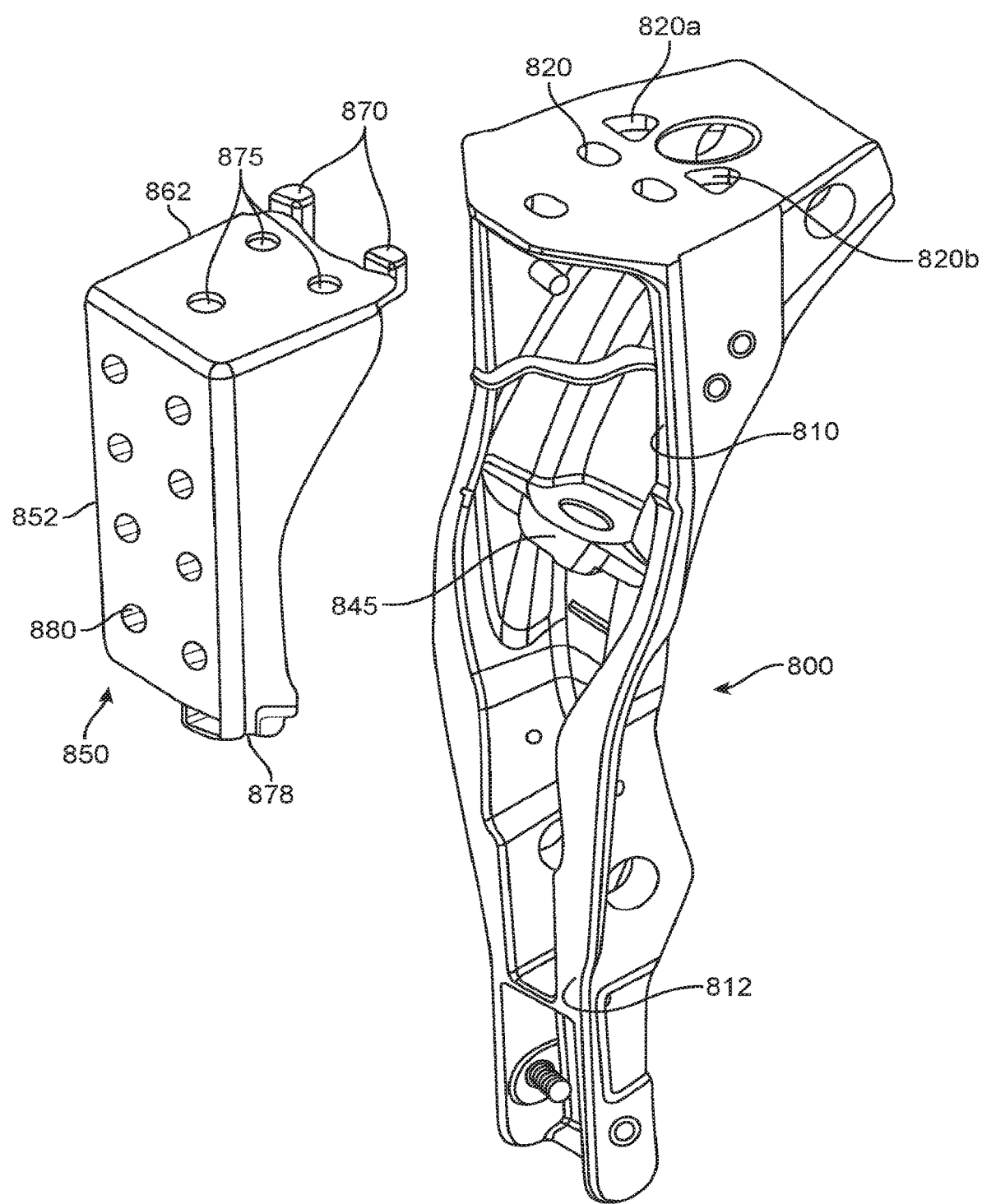
FIG. 8H shows a rear perspective view of the separated fuel system bracket and the chassis bracket.

FIG. 8H shows a rear perspective view of a separate fuel system bracket 800 and chassis bracket 850. The chassis bracket may include protrusions 870 configured to hook into holes 820*a*, 820*b* of the fuel system bracket. The chassis bracket may include a lower surface 878 configured to rest against an interior surface 845 of the fuel system bracket. The combination of the top interlock (between the holes and the protrusions) and the lower support (between the lower surface and interior surface) may be sufficient to keep the brackets engaged. The weight of the fuel system bracket and/or the attached vehicle fuel system may keep the fuel system bracket engaged with the chassis bracket.

In some embodiments various configurations of bracket portions may be used in order to permit a drop and go mounting of a fuel system on a vehicle. The bracket portions may be configured to mate or interlock mechanically at one point, two points, three points or more points. Such mating may occur via insertion of pins into cutouts/grooves, protrusions into indentations or holes, flanges into grooves, hook portions, or any meeting of complementary shapes or features. In some instances, at least one of the mating points may be at or near a top surface of the bracket portions. In some embodiments, the bracket portions may be engaged by a bracket portion being attached to a fuel system being dropped downward to a bracket portion being mounted on a vehicle chassis. A fuel system bracket may be dropped downward onto a chassis bracket. A rotational motion may also be required to cause the bracket portions to engage. For example, the fuel system bracket may come toward the chassis bracket at an angle, and then be turned slightly to settle into engagement.

Once mechanically engaged, the bracket portions may not translate relative to one another without rotating with respect to one another, even if no fasteners are engaged at that point. The shape of the bracket interlocks and/or the gravity of the fuel system may be sufficient to keep the brackets together. Additional fasteners or components may be added to assist with stability and longevity of the connection. In some embodiments, once the bracket portions are engaged, fewer than 10, 9, 8, 7, 6, 5, 4, 3, or 2 fasteners may be employed to affix the bracket portions relative to one another. Welding or soldering steps may not be required.

Figure 5:
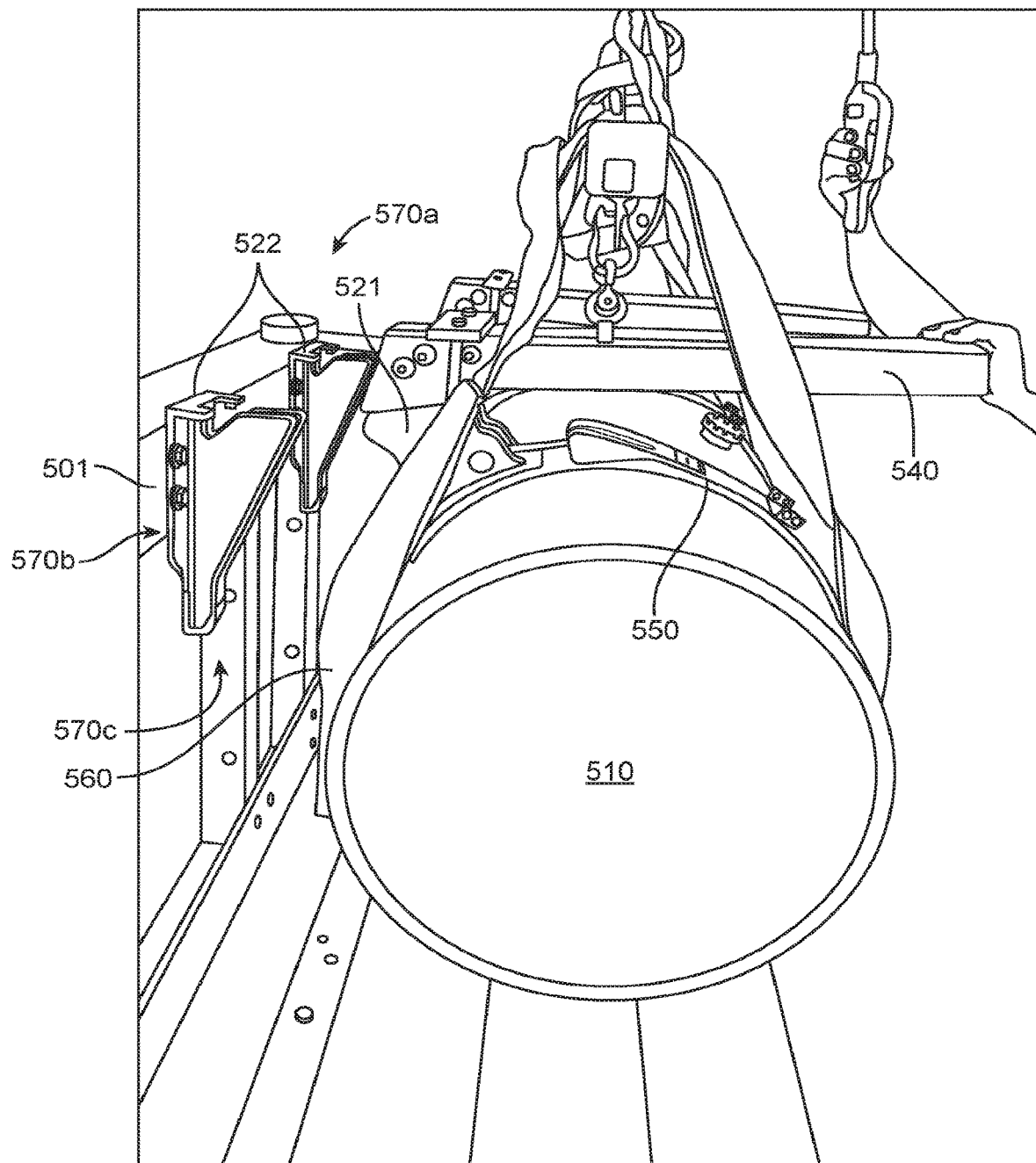
FIG. 5 is a photograph of mounting of a fuel system using a drop and go bracket and a lift assist device.

FIG. 5 is a photograph of mounting of a fuel tank or system 510 using a plurality of drop and go brackets and one or more lift assist devices 540. Each drop and go bracket may comprise a tank or system bracket 521 and a chassis bracket 522. The chassis bracket 522 may be attached to a frame rail 501 (e.g., frame rail of a truck). The system bracket 521 may be attached to the fuel tank or system 510. The tank bracket 521 may be dropped into place in the chassis bracket 522, and pins, protrusions, holding plates and or other connecting means may mate/connect together to lock the bracket in place. The brackets may then optionally be attached together with a single plate on top (not shown), as described elsewhere herein.

The fuel tank or system 510 may be any fuel system described herein, including but not limited to a fuel tank housed in a cover, a fuel tank partially housed in a cover or a fuel tank not housed in a cover. For example, the bracket 521 may be attached to the fuel tank 510 (e.g., Diesel fuel tank, as shown in FIG. 5, or an LNG tank), wherein the fuel tank may or may not be housed in a cover. In another example, a CNG or LNG tank may be housed in a cover.

The fuel tank or system 510 may be attached to the bracket 521 via one or more mating connectors or attachment members, such as mating, connecting or attachment members described elsewhere herein. For example, the bracket 521 may be secured to the fuel system via one or more bolts, with corresponding apertures or connecting members provided on the bracket 521 and the system 510. In cases where the fuel system comprises a cover, the cover may be bolted to the system bracket 521. In some cases where the fuel system does not comprise a cover, the fuel tank may be bolted to the tank or system bracket 521. The members may further include one or more straps 550, which may be used to attach the bracket 521 to the fuel tank 510. For example, the strap 550 may be non-rotatably secured to the tank 510, with the bracket 521 securely attached to or integrally formed with the strap 550. In some cases, the fuel tank 510 may not be attached using the strap 550 but may use other means to connect the tank to structural mounting points, such as, for example, in a case where the tank is supported at each end of the tank, with the weight supported on the tank boss or neck. The drop and go mounting may be used for mounting one or more neck mounts. For example, the fuel tank or system 510 may be neck mounted to the vehicle using one or more drop and go brackets. One or more drop and go brackets may be used to mount the fuel tank or system 510 in one or more locations, including but not limited to the tank or system body, one or more ends, one or more necks and/or any other structural mounting points or members. The drop and go mounting may be facilitated by the lift assist devices 540. The fuel tank 510 may be lifted and positioned by the lift assist devices 540 with gun turret-like construction required to lift the tank assembly and drop it onto the chassis bracket 522. The drop and go mounting may permit fuel systems to be mounted onto a vehicle without removing the vehicle from an assembly line.

Regardless of fuel system used, the drop and go bracket may be accessed from one or more directions indicated in FIG. 5. Access may be provided prior to, during, and after dropping the fuel system 510 with bracket 521 onto the bracket 522. For example, the drop and go bracket may be accessed from a top direction 570a when the brackets 521 and 522 have engaged in order to fasten connectors and/or to fasten the top plate. The fasteners may then be installed from the top direction 570a outside the vehicle. In another example, access may be provided from the top direction 570a and/or a side direction 570b during engagement of the brackets 521, 522 to assure proper alignment during engagement. In some embodiments, access may be provided from the bottom direction 570c. In some embodiments, an impact wrench may be used to bolt fasteners on the drop and go bracket, the bracket holding the fuel tank or system (e.g., after engagement of brackets 521, 522, wherein the fuel tank or system is held by the bracket to the frame 501). The drop and go bracket may enable access from the top direction 570a, the side direction 570b and/or the bottom direction 570c. For example, when the fuel system 510 is a CNG or LNG fuel system housed in a cover, the drop and go bracket may enable top access 570a in order to fasten connectors and/or perform mounting tasks while the fuel system is held by the bracket. In another example, a fuel tank, such as a Diesel fuel tank, may be held by the drop and go bracket, and one or more access directions 570a or 570b may be provided.

One or more belly straps 560 shown in FIG. 5 may or may not be used to provide additional safety, independently of the drop and go brackets and lift assist devices.

The invention may offer significant advantages with respect to existing options for mounting fuel systems to vehicles, such as, for example, the installation of a fuel tank to a vehicle at original equipment manufacturer (OEM) factories. For example, the drop and go bracket disclosed herein may be used by vehicle OEMs to install CNG or LNG tanks on the production line, thereby reducing production time so that the tanks can be installed on the line instead of in a retrofit shop after final vehicle assembly. Currently, side-mounted compressed gas tanks are rigidly mounted to the chassis in a complicated and lengthy procedure that requires the vehicle be taken off of the assembly line to install the tanks. This procedure can take hours. The drop and go bracket system provided herein can drastically reduce the installation time at OEM factories (e.g., to a few minutes). Systems and methods provided herein may also be used for quick mounting of other frame mounted vehicle equipment, such as hydraulic tanks, battery boxes, tool boxes, etc.

The systems and methods herein may also be advantageously applied to enable reliable, rapid and safe mounting of vehicle fuel systems during replacement and/or retrofitting of existing vehicle fleets.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A vehicle equipment mounting system comprising:
   a first bracket portion configured to be coupled to a vehicle chassis, wherein the first bracket portion includes a bottom surface and a top surface; and
   a second bracket portion configured to be coupled to a frame mountable vehicle equipment, wherein the first bracket portion and the second bracket portion are configured to be engaged and interlock mechanically at one or more points by meeting of complimentary features on the first bracket potion and the second bracket portion in order to mount the frame mountable vehicle equipment to the vehicle chassis; and
   wherein the second bracket portion has an overhanging lip or an extension;
   wherein the top surface of the first bracket portion can contact an underside of the overhanging lip or the extension of the second bracket portion, and
   wherein the frame mountable vehicle equipment comprises a vehicle fuel system, the vehicle fuel system including one or more fuel tanks.

2. The system of claim 1, wherein the first bracket portion includes a groove, indentation, or hole into which a part of the second bracket portion slides.

3. The system of claim 1, further comprising one or more neck mounts for supporting one or more bosses or necks of the one or more fuel tanks.

4. The system of claim 1, wherein after the first bracket portion and the second bracket portion are connected to one another, the first bracket portion and the second bracket portion are separable from one another via a combination of motions in both a lateral direction and a vertical direction, including rotation of the first bracket portion and the second bracket portion relative to one another.

5. The vehicle equipment mounting system of claim 1, wherein one or more top openings on the second bracket portion align with one or more top holes on the first bracket portion in use when the first bracket portion and the second bracket portion are engaged and interlock mechanically.

6. The vehicle equipment mounting system of claim 1, wherein the second bracket portion includes an interior surface configured to engage with the bottom surface of the first bracket portion.

7. The vehicle equipment mounting system of claim 6, wherein the bottom surface of the first bracket portion and the interior surface of the second bracket portion have through-holes that align when the bracket portions are engaged with one another.

8. The vehicle equipment mounting system of claim 1, wherein the overhanging lip or extension is an overhanging lip configured to contact at least a portion of the top surface of the first bracket portion.

9. The vehicle equipment mounting system of claim 1, wherein the first bracket portion includes one or more apertures configured to facilitate attachment of the first bracket portion to the vehicle chassis.

10. The vehicle equipment mounting system of claim 1, wherein the first bracket portion includes a first plurality of vertical side walls, the second bracket portion includes a second plurality of vertical side walls, and the second plurality of vertical side walls cover at least a portion of the first plurality of vertical side walls when the first bracket portion and the second bracket portion are engaged.

11. A vehicle equipment mounting system comprising:
a first bracket portion configured to be coupled to a vehicle chassis, wherein the first bracket portion includes a cavity defined by a plurality of walls, a downwardly-extending portion, and an upwardly-oriented surface; and
a second bracket portion configured to be coupled to a vehicle equipment comprising a fuel tank, wherein the first bracket portion and the second bracket portion are configured to be mechanically engaged at one or more points by meeting of complimentary features on the first bracket potion and the second bracket portion in order to mount the frame mountable vehicle equipment to the vehicle chassis; and
wherein the second bracket portion has an extension,
wherein the upwardly-oriented surface of the first bracket portion is configured to contact an underside of the extension of the second bracket portion,
wherein the second bracket portion further comprises a receiving portion having a cavity, and
wherein the downwardly-extending portion of the first bracket portion is configured to be received by the receiving portion of the second bracket portion.

12. The vehicle equipment mounting system of claim 11, wherein the upwardly-oriented surface of the first bracket portion is located above the downwardly-extending portion.

13. The vehicle equipment mounting system of claim 11, wherein the upwardly-oriented surface of the first bracket portion is configured to support at least a portion of a weight of the second bracket portion when the first bracket portion and the second bracket portion are engaged.

14. The vehicle equipment mounting system of claim 11, wherein the first bracket portion includes one or more apertures configured to facilitate attachment of the first bracket portion to the vehicle chassis.

15. The vehicle equipment mounting system of claim 11, wherein the first bracket portion includes a first plurality of vertical side walls, the second bracket portion includes a second plurality of vertical side walls, and the second plurality of vertical side walls cover at least a portion of the first plurality of vertical side walls when the first bracket portion and the second bracket portion are engaged.

16. A vehicle equipment mounting system comprising:
a first bracket portion configured to be coupled to a vehicle chassis, wherein the first bracket portion includes an upwardly-oriented surface; and
a second bracket portion configured to be coupled to a frame mountable vehicle equipment, wherein the first bracket portion and the second bracket portion are configured to be engaged at one or more points by meeting of complimentary features on the first bracket potion and the second bracket portion in order to mount the frame mountable vehicle equipment to the vehicle chassis; and
wherein the second bracket portion has an extension,
wherein the upwardly-oriented surface of the first bracket portion can contact an underside of the extension of the second bracket portion, and
wherein the second bracket portion further includes a curved portion configured to conform to and receive a portion of a fuel tank.

17. The vehicle equipment mounting system of claim 16, wherein the first bracket portion includes one or more apertures configured to facilitate attachment of the first bracket portion to the vehicle chassis.

18. The vehicle equipment mounting system of claim 16, wherein the first bracket portion includes a first plurality of vertical side walls, the second bracket portion includes a second plurality of vertical side walls, and the second plurality of vertical side walls cover at least a portion of the first plurality of vertical side walls when the first bracket portion and the second bracket portion are engaged.

19. A vehicle equipment mounting system comprising:
a first bracket portion configured to be coupled to a vehicle chassis, wherein the first bracket portion includes an upwardly-oriented surface; and
a second bracket portion configured to be coupled to a frame mountable vehicle equipment comprising a fuel tank, wherein the first bracket portion and the second bracket portion are configured to be engaged at one or more points by meeting of complimentary features on the first bracket potion and the second bracket portion in order to mount the frame mountable vehicle equipment to the vehicle chassis; and
wherein the second bracket portion has an extension,
wherein the upwardly-oriented surface of the first bracket portion can contact an underside of the extension of the second bracket portion,
wherein one or more first apertures of the first bracket portion and one or more second apertures of the second bracket portion are aligned when the first bracket portion and the second bracket portion are engaged, and wherein the one or more first apertures and the one or more second apertures are configured to receive respective one or more fasteners to secure the first bracket portion to the second bracket portion.

20. The vehicle equipment mounting system of claim 19, wherein the first bracket portion includes one or more apertures configured to facilitate attachment of the first bracket portion to the vehicle chassis.

21. The vehicle equipment mounting system of claim 19, wherein the first bracket portion includes a first plurality of vertical side walls, the second bracket portion includes a second plurality of vertical side walls, and the second plurality of vertical side walls cover at least a portion of the first plurality of vertical side walls when the first bracket portion and the second bracket portion are engaged.

* * * * *

UNITED STATES PATENT AND TRADEMARK OFFICE
CERTIFICATE OF CORRECTION

| | | |
|---|---|---|
| PATENT NO. | : 11,548,380 B2 | Page 1 of 1 |
| APPLICATION NO. | : 16/922866 | |
| DATED | : January 10, 2023 | |
| INVENTOR(S) | : Todd F. Sloan et al. | |

It is certified that error appears in the above-identified patent and that said Letters Patent is hereby corrected as shown below:

In the Specification

In Column 6, Line 31, delete "and or" and insert --and/or--.

In Column 8, Line 14, Before "FIG. 4A," delete "FIGS. 4A-G".

In Column 13, Line 6, delete "bracket," and insert --bracket),--.

In Column 13, Line 47, delete "fo" and insert --of--.

In Column 14, Line 66, delete "and or" and insert --and/or--.

In the Claims

In Column 16, Claim 1, Line 57, delete "potion" and insert --portion--.

In Column 17, Claim 11, Line 56, delete "potion" and insert --portion--.

In Column 18, Claim 16, Line 29, delete "potion" and insert --portion--.

In Column 18, Claim 19, Line 59, delete "potion" and insert --portion--.

Signed and Sealed this
Thirteenth Day of June, 2023

Katherine Kelly Vidal
*Director of the United States Patent and Trademark Office*